United States Patent
Fujimoto et al.

(10) Patent No.: US 12,497,097 B2
(45) Date of Patent: Dec. 16, 2025

(54) AUTOMATIC DRIVING SUPPORT APPARATUS

(71) Applicant: Mitsubishi Electric Corporation, Tokyo (JP)

(72) Inventors: Chiaki Fujimoto, Tokyo (JP); Jun Kitagawa, Tokyo (JP); Masahiko Orii, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 140 days.

(21) Appl. No.: 18/287,350

(22) PCT Filed: Jun. 28, 2021

(86) PCT No.: PCT/JP2021/024281
§ 371 (c)(1),
(2) Date: Oct. 18, 2023

(87) PCT Pub. No.: WO2023/275914
PCT Pub. Date: Jan. 5, 2023

(65) Prior Publication Data
US 2024/0383527 A1 Nov. 21, 2024

(51) Int. Cl.
*B62D 5/04* (2006.01)
*B62D 6/00* (2006.01)
*B62D 15/02* (2006.01)

(52) U.S. Cl.
CPC ......... *B62D 5/0484* (2013.01); *B62D 5/0487* (2013.01); *B62D 5/049* (2013.01);
(Continued)

(58) Field of Classification Search
CPC .... B62D 5/0484; B62D 5/0487; B62D 5/049; B62D 5/0493; B62D 6/002; B62D 15/0235
See application file for complete search history.

(56) References Cited

U.S. PATENT DOCUMENTS

| | | | |
|---|---|---|---|
| 9,688,303 B1 * | 6/2017 | Yang ................... | B62D 5/0481 |
| 2002/0019690 A1 * | 2/2002 | Kurishige .............. | B62D 6/008 |
| | | | 180/443 |

(Continued)

FOREIGN PATENT DOCUMENTS

| | | |
|---|---|---|
| JP | 2018-192865 A | 12/2018 |
| JP | 2019-014432 A | 1/2019 |
| WO | 2020/136619 A1 | 7/2020 |

OTHER PUBLICATIONS

International Search Report for PCT/JP2021/024281 dated Aug. 10, 2021 (PCT/ISA/210).

(Continued)

*Primary Examiner* — George C Jin
(74) *Attorney, Agent, or Firm* — Sughrue Mion, PLLC

(57) ABSTRACT

To provide an automatic driving support apparatus which can continue the automatic steering, when the abnormality of the control system of the motor for steering is detected. An automatic driving support apparatus including: an automatic steering control unit that calculates a steering angle command value of a steering apparatus of the ego vehicle based on the detected traveling state and the detected peripheral state; a motor for steering; a motor drive circuit; a steering angle control unit that calculates a motor output command value based on a steering angle command value and a steering angle detection value; a motor control unit that generates driving signals of the motor drive circuit based on the motor output command value; and an abnormality detection unit, wherein the motor control unit generates driving signals at abnormal time according to a content of abnormality related to the motor for steering.

15 Claims, 35 Drawing Sheets

| ABNORMAL PART | EACH CONTROL AT ABNORMAL TIME | | |
|---|---|---|---|
| | AUTOMATIC STEERING CONTROL UNIT | STEERING ANGLE CONTROL UNIT | MOTOR CONTROL UNIT |
| MOTOR DRIVE CIRCUIT (ABNORMALITY OF ONE PHASE) | NO CHANGE | AVOIDANCE OF TORQUE REDUCTION STEERING ANGLE | TWO-PHASE CONTROL |
| CURRENT SENSOR | NO CHANGE | NO CHANGE | CURRENT FEEDFORWARD CONTROL |
| ROTATION ANGLE SENSOR | NO CHANGE | STEERING ANGLE ESTIMATION USING MOTOR ANGLE ESTIMATION VALUE | MOTOR ANGLE ESTIMATION CONTROL |
| TRAVELING STATE DETECTION APPARATUS | ESTIMATING FROM OTHER SENSOR AND SUBSTITUTING | NO CHANGE | NO CHANGE |
| PERIPHERY MONITORING APPARATUS | ESTIMATING FROM OTHER SENSOR AND SUBSTITUTING | NO CHANGE | NO CHANGE |

(52) U.S. Cl.
CPC .......... *B62D 5/0493* (2013.01); *B62D 6/002* (2013.01); *B62D 15/0235* (2013.01)

(56) References Cited

U.S. PATENT DOCUMENTS

| | | | |
|---|---|---|---|
| 2007/0233345 A1* | 10/2007 | Endo | B62D 5/049 |
| | | | 701/41 |
| 2011/0035114 A1 | 2/2011 | Yoneda et al. | |
| 2015/0239492 A1* | 8/2015 | Yukitake | B62D 5/0484 |
| | | | 701/43 |
| 2015/0367881 A1 | 12/2015 | Tsunoda et al. | |
| 2018/0178832 A1* | 6/2018 | Minaki | B62D 15/0235 |
| 2018/0229764 A1 | 8/2018 | Sugawara et al. | |
| 2019/0111964 A1* | 4/2019 | Kim | B62D 5/0463 |
| 2019/0193776 A1 | 6/2019 | Tsubaki et al. | |
| 2020/0079394 A1 | 3/2020 | Masuda et al. | |
| 2020/0094871 A1 | 3/2020 | Lee et al. | |
| 2020/0180689 A1* | 6/2020 | Asaka | G01D 3/08 |
| 2020/0403543 A1* | 12/2020 | Imamura | B62D 5/0484 |
| 2022/0080954 A1 | 3/2022 | Raffone et al. | |
| 2022/0105983 A1* | 4/2022 | Omikawa | B62D 15/025 |
| 2022/0135056 A1 | 5/2022 | Masuda et al. | |

OTHER PUBLICATIONS

Extended European Search Report dated Oct. 8, 2024 from the European Patent Office in Application No. 21948229.6.

* cited by examiner

FIG. 3

| ABNORMAL PART | EACH CONTROL AT ABNORMAL TIME ||| |
|---|---|---|---|
| | AUTOMATIC STEERING CONTROL UNIT | STEERING ANGLE CONTROL UNIT | MOTOR CONTROL UNIT |
| MOTOR DRIVE CIRCUIT (ABNORMALITY OF ONE PHASE) | NO CHANGE | AVOIDANCE OF TORQUE REDUCTION STEERING ANGLE | TWO-PHASE CONTROL |
| CURRENT SENSOR | NO CHANGE | NO CHANGE | CURRENT FEEDFORWARD CONTROL |
| ROTATION ANGLE SENSOR | NO CHANGE | STEERING ANGLE ESTIMATION USING MOTOR ANGLE ESTIMATION VALUE | MOTOR ANGLE ESTIMATION CONTROL |
| TRAVELING STATE DETECTION APPARATUS | ESTIMATING FROM OTHER SENSOR AND SUBSTITUTING | NO CHANGE | NO CHANGE |
| PERIPHERY MONITORING APPARATUS | ESTIMATING FROM OTHER SENSOR AND SUBSTITUTING | NO CHANGE | NO CHANGE |

WHEN OPEN CIRCUIT ABNORMALITY OF ONE PHASE IS DETECTED

FIG. 19 WHEN DETECTION ABNORMALITY OF STEERING ANGLE DETECTION VALUE IS DETECTED

FIG. 22

| ABNORMAL PART | EACH CONTROL AT ABNORMAL TIME | | |
|---|---|---|---|
| | AUTOMATIC STEERING CONTROL UNIT | STEERING ANGLE CONTROL UNIT | MOTOR CONTROL UNIT |
| MOTOR DRIVE CIRCUIT (ABNORMALITY OF ONE PHASE) | NO CHANGE | AVOIDANCE OF TORQUE REDUCTION STEERING ANGLE | TWO-PHASE CONTROL |
| CURRENT SENSOR | NO CHANGE | NO CHANGE | CURRENT FEEDFORWARD CONTROL |
| STEERING ANGLE SENSOR | NO CHANGE | ESTIMATING STEERING ANGLE BY INTEGRATION VALUE OF MOTOR ANGLE | NO CHANGE |
| ROTATION ANGLE SENSOR | NO CHANGE | NO CHANGE | MOTOR ANGLE ESTIMATION CONTROL |
| TRAVELING STATE DETECTION APPARATUS | ESTIMATING FROM OTHER SENSOR AND SUBSTITUTING | NO CHANGE | NO CHANGE |
| PERIPHERY MONITORING APPARATUS | ESTIMATING FROM OTHER SENSOR AND SUBSTITUTING | NO CHANGE | NO CHANGE |
| TORQUE SENSOR | ESTIMATING FROM DEVIATION BETWEEN STEERING ANGLE BY STEERING ANGLE SENSOR AND STEERING ANGLE BY MOTOR ANGLE | NO CHANGE | NO CHANGE |

FIG. 25

| ABNORMAL PART | EACH CONTROL AT ABNORMAL TIME | | |
|---|---|---|---|
| | AUTOMATIC STEERING CONTROL UNIT | STEERING ANGLE CONTROL UNIT | MOTOR CONTROL UNIT |
| MOTOR DRIVE CIRCUIT (ABNORMALITY OF ONE PHASE) | NO CHANGE | AVOIDANCE OF TORQUE REDUCTION STEERING ANGLE | TWO-PHASE CONTROL |
| CURRENT SENSOR | NO CHANGE | NO CHANGE | CURRENT FEEDFORWARD CONTROL |
| STEERING ANGLE SENSOR WITH LOW RESOLUTION | NO CHANGE | ESTIMATING STEERING ANGLE BY INTEGRATION VALUE OF MOTOR ANGLE | NO CHANGE |
| ROTATION ANGLE SENSOR | NO CHANGE | ESTIMATING STEERING ANGLE BY PERFORMING SMOOTHING PROCESSING TO STEERING ANGLE DETECTION VALUE OF STEERING ANGLE SENSOR | MOTOR ANGLE ESTIMATION CONTROL |
| TRAVELING STATE DETECTION APPARATUS | ESTIMATING FROM OTHER SENSOR AND SUBSTITUTING | NO CHANGE | NO CHANGE |
| PERIPHERY MONITORING APPARATUS | ESTIMATING FROM OTHER SENSOR AND SUBSTITUTING | NO CHANGE | NO CHANGE |
| TORQUE SENSOR | ESTIMATING FROM DEVIATION BETWEEN STEERING ANGLE BY STEERING ANGLE SENSOR AND STEERING ANGLE BY MOTOR ANGLE | NO CHANGE | NO CHANGE |

FIG. 30

| ABNORMAL PART | EACH CONTROL AT ABNORMAL TIME | | |
|---|---|---|---|
| | AUTOMATIC STEERING CONTROL UNIT | STEERING ANGLE CONTROL UNIT | MOTOR CONTROL UNIT |
| MOTOR DRIVE CIRCUIT (ABNORMALITY OF ONE PHASE) | NO CHANGE | NO CHANGE | CONTROLLING ON/OFF SWITCHING DEVICES WITHOUT SHORT CIRCUIT |
| CURRENT SENSOR | NO CHANGE | NO CHANGE | CURRENT FEEDFORWARD CONTROL |
| STEERING ANGLE SENSOR | NO CHANGE | ESTIMATING MOTOR ANGLE BY HIGH FREQUENCY CURRENT COMPONENT, AND ESTIMATING STEERING ANGLE BY INTEGRATION VALUE OF MOTOR ANGLE | SUPERIMPOSING HIGH-FREQUENCY VOLTAGE FOR ANGLE ESTIMATION |
| TRAVELING STATE DETECTION APPARATUS | ESTIMATING FROM OTHER SENSOR AND SUBSTITUTING | NO CHANGE | NO CHANGE |
| PERIPHERY MONITORING APPARATUS | ESTIMATING FROM OTHER SENSOR AND SUBSTITUTING | NO CHANGE | NO CHANGE |
| TORQUE SENSOR | ESTIMATING FROM DEVIATION BETWEEN STEERING ANGLE BY STEERING ANGLE SENSOR AND STEERING ANGLE BY MOTOR ANGLE | NO CHANGE | NO CHANGE |

FIG. 39

| ABNORMAL PART | EACH CONTROL AT ABNORMAL TIME | | |
|---|---|---|---|
| | AUTOMATIC STEERING CONTROL UNIT | STEERING ANGLE CONTROL UNIT | MOTOR CONTROL UNIT |
| MOTOR DRIVE CIRCUIT (ABNORMALITY OF ONE PHASE) | NO CHANGE | AVOIDANCE OF TORQUE REDUCTION STEERING ANGLE | TWO-PHASE CONTROL |
| CURRENT SENSOR | NO CHANGE | NO CHANGE | CURRENT FEEDFORWARD CONTROL |
| STEERING ANGLE SENSOR WITH LOW RESOLUTION | NO CHANGE | ESTIMATING STEERING ANGLE BY INTEGRATION VALUE OF MOTOR ANGLE | NO CHANGE |
| ROTATION ANGLE SENSOR | NO CHANGE | ESTIMATING STEERING ANGLE BY PERFORMING SMOOTHING PROCESSING TO STEERING ANGLE DETECTION VALUE OF STEERING ANGLE SENSOR | MOTOR ANGLE ESTIMATION CONTROL |
| TRAVELING STATE DETECTION APPARATUS | ESTIMATING FROM OTHER SENSOR AND SUBSTITUTING | NO CHANGE | NO CHANGE |
| PERIPHERY MONITORING APPARATUS | ESTIMATING FROM OTHER SENSOR AND SUBSTITUTING | NO CHANGE | NO CHANGE |
| TORQUE SENSOR | ESTIMATING FROM DEVIATION BETWEEN STEERING ANGLE BY STEERING ANGLE SENSOR AND STEERING ANGLE BY MOTOR ANGLE | NO CHANGE | NO CHANGE |
| MOTOR DRIVING CIRCUIT FOR REACTION FORCE (ABNORMALITY OF ONE PHASE) | NO CHANGE | NO CHANGE | TWO-PHASE CONTROL |
| CURRENT SENSOR FOR REACTION FORCE | NO CHANGE | NO CHANGE | CURRENT FEEDFORWARD CONTROL |
| ROTATION ANGLE SENSOR FOR REACTION FORCE | NO CHANGE | NO CHANGE | MOTOR ANGLE ESTIMATION CONTROL |

AUTOMATIC DRIVING SUPPORT APPARATUS

CROSS REFERENCE TO RELATED APPLICATIONS

This application is a National Stage of International Application No. PCT/JP2021/024281 filed Jun. 28, 2021.

TECHNICAL FIELD

The present disclosure relates to an automatic driving support apparatus.

BACKGROUND ART

As an example of the technology of dealing with by a change of control when an abnormality occurs during the driving support, there is the technology such as patent document 1. In the technology of patent document 1, when abnormality is detected in the current indication value to the motor for steering of the electric power steering apparatus, the motion of vehicle in the rotation direction is suppressed by calculating the current indication value which supplies a counter current reverse to the current indication value according to the yaw angle speed of vehicle, and the instability of the vehicle behavior is prevented.

As another example of the technology of dealing with when an abnormality occurs during the driving support, there is the technology such as patent document 2. In the technology of patent document 2, at the abnormal time of the first sensor, the driving support is continued using the second sensor. Or, at the abnormal time of the first yaw angle speed sensor, the yaw angle speed is estimated from the steering angle and the vehicle speed, the target steering angle, that is, the steering angle command value, is determined based on the estimated yaw acceleration, and the target trajectory tracking control is performed.

CITATION LIST

Patent Literature

Patent document 1: JP 2019-014432 A
Patent document 2: JP 2018-192865 A

SUMMARY OF INVENTION

Technical Problem

However, in the technology of patent document 1, the abnormality of the current indication value can be dealt with, but the abnormality of the control system of the motor for steering, such as the driving circuit, and the controller which control current flowing into the motor for steering according to current indication value, cannot be dealt with. And, it is not a technology of identifying which components related to the generation of current indication value failed, but it calculates only the current indication value for supplying the counter current which suppresses the yaw acceleration. Accordingly, controls suitable for the abnormal state is not performed, the instability of the vehicle behavior can be prevented, but the driving support for following the target traveling trajectory cannot be continued.

In patent document 2, since the second sensor is used at the abnormal time of the first sensor, cost becomes high due to the redundancy of sensors. The yaw angle speed can be estimated, but when abnormality occurs in other than the yaw angle speed sensor, the driving support cannot be continued. Especially, the abnormality of the control system of the motor for steering mentioned above cannot be dealt with.

Then, the purpose of the present disclosure is to provide an automatic driving support apparatus which can continue the automatic steering, when the abnormality of the control system of the motor for steering, such as the driving circuit, and the controller of the motor for steering, is detected.

Solution to Problem

An automatic driving support apparatus according to the present disclosure, including:
  an automatic steering control unit that detects a traveling state of an ego vehicle and a peripheral state of the ego vehicle, and calculates a steering angle command value of a steering apparatus of the ego vehicle based on the detected traveling state and the detected peripheral state;
  a motor for steering that drives the steering apparatus;
  a motor drive circuit that is provided with switching devices, and turns on and off power supplied to the motor for steering;
  a steering angle control unit that calculates a motor output command value related to an output torque of the motor for steering, based on the steering angle command value and a steering angle detection value;
  a motor control unit that generates driving signals which make the switching devices of the motor drive circuit turn on and off, based on the motor output command value; and
  an abnormality detection unit which detects an abnormality related to the motor for steering which is an abnormality occurred in a control system of the motor for steering,
  wherein the motor control unit generates driving signals at abnormal time according to a content of the abnormality related to the motor for steering, based on the motor output command value, when the abnormality related to the motor for steering is detected.

Advantage of Invention

According to the automatic driving support apparatus of the present disclosure, even when the abnormality related to the motor for steering occurred, the driving signals at abnormal time are generated, the driving of the steering apparatus by the motor for steering is continued, and the automatic steering can be continued. By continuing the automatic steering, safeness can be given to the driver. Without adding a hardware only for the abnormal time, the abnormality can be dealt with by the processing which generates the driving signals at abnormal time, and increase in cost can be suppressed.

BRIEF DESCRIPTION OF THE DRAWINGS

FIG. 3 shows a figure in which processings when the abnormality of each sensor is detected are summarized, according to Embodiment 1;

FIG. 22 shows a figure in which processings when the abnormality of each sensor is detected are summarized, according to Embodiment 2;

FIG. 25 shows a figure in which processings when the abnormality of each sensor is detected are summarized, according to Embodiment 3;

FIG. 30 shows a figure in which processings when the abnormality of each sensor is detected are summarized, according to Embodiment 4;

FIG. 39 shows a figure in which processings when the abnormality of each sensor is detected are summarized, according to Embodiment 5.

DETAILED DESCRIPTION OF THE EMBODIMENTS

1. Embodiment 1

Figure 1:
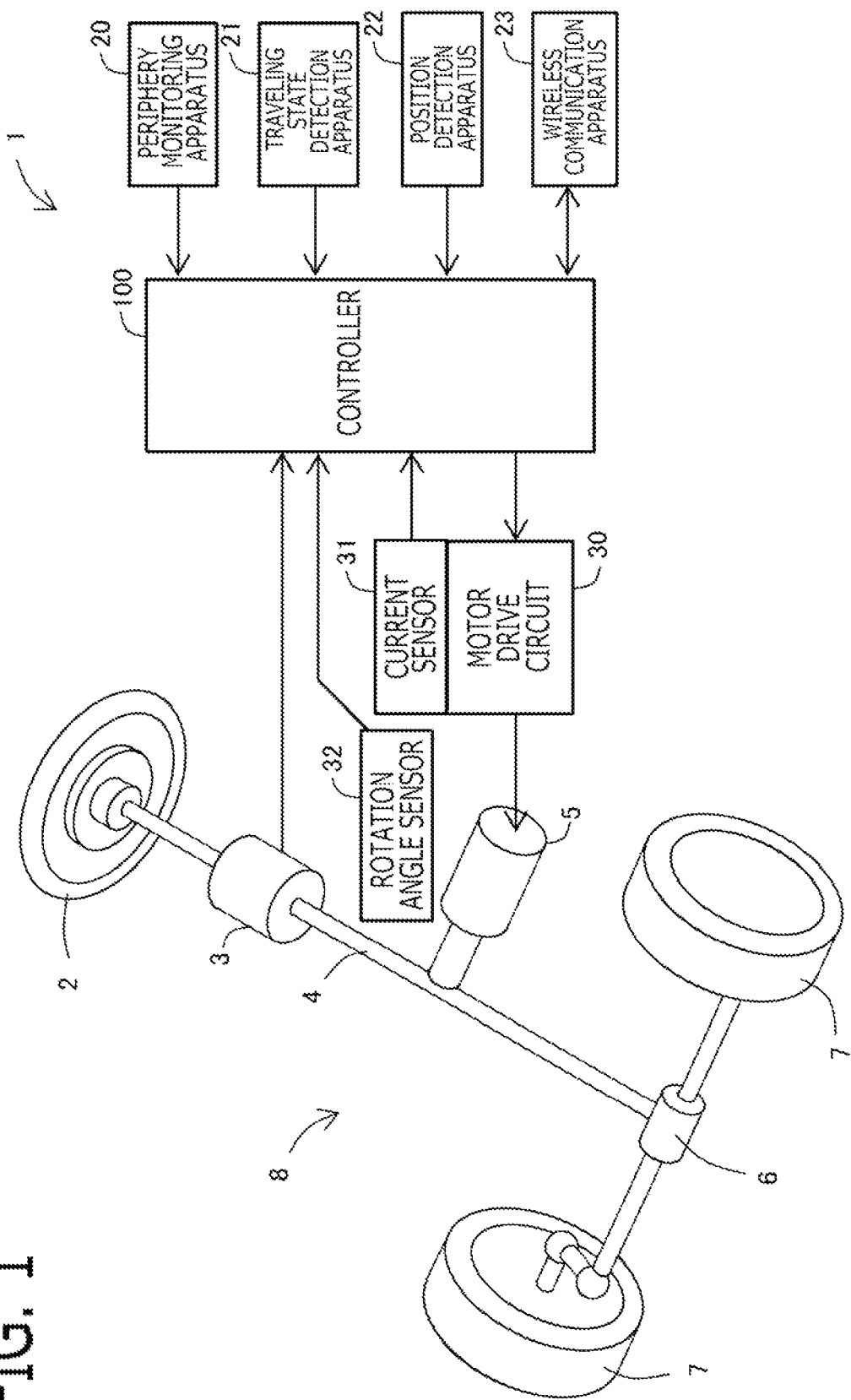
FIG. 1 is a schematic configuration diagram of the automatic driving support apparatus according to Embodiment 1.
Figure 2:
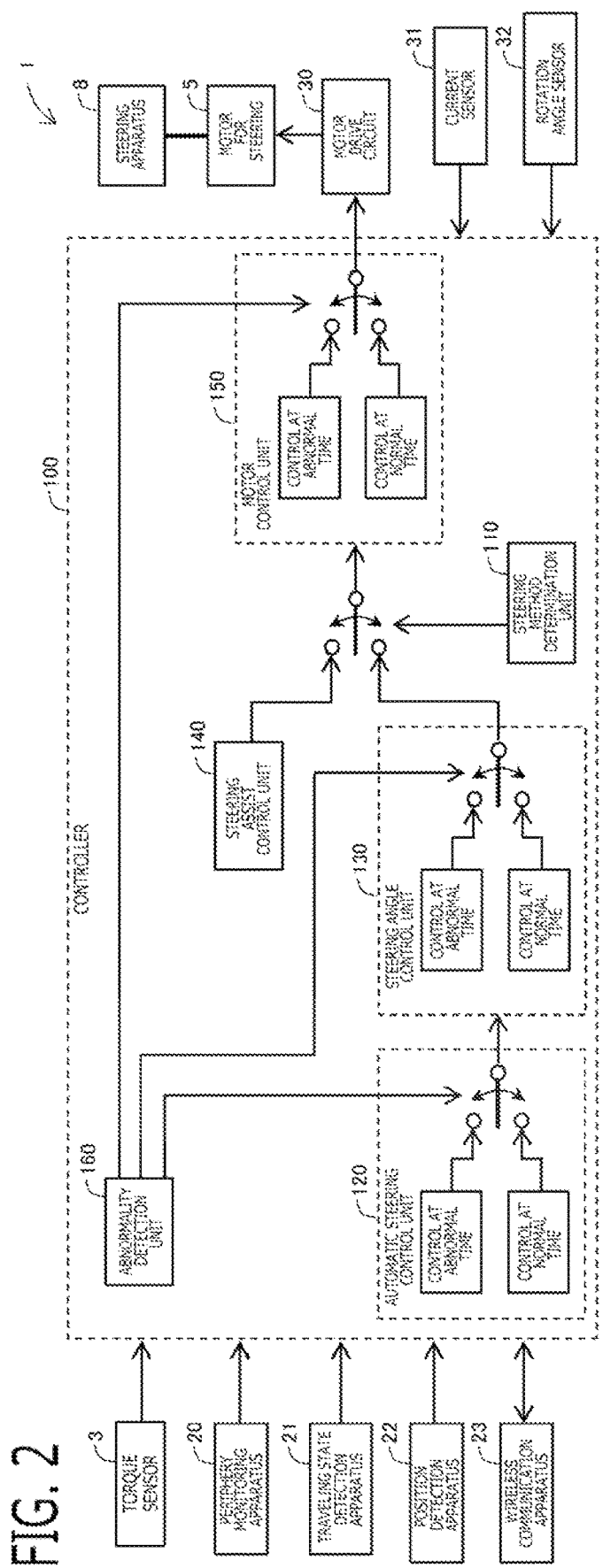
FIG. 2 is a schematic block diagram of the automatic driving support apparatus according to Embodiment 1.

An automatic driving support apparatus 1 according to Embodiment 1 will be explained with reference to drawings. The automatic driving support apparatus 1 is mounted on a vehicle. FIG. 1 shows a schematic configuration diagram of the automatic driving support apparatus 1, and FIG. 2 shows a schematic block diagram of the automatic driving support apparatus 1. FIG. 3 shows a figure in which processings when the abnormality of each sensor is detected are summarized.

1-1. Basic Configuration of Automatic Driving Support Apparatus 1

The automatic driving support apparatus 1 is provided with a motor for steering 5, a motor drive circuit 30, a controller 100, a periphery monitoring apparatus 20, a traveling state detection apparatus 21, a position detection apparatus 22, a wireless communication apparatus 23, and the like.

The periphery monitoring apparatus 20 is an apparatus which detects a peripheral state of an ego vehicle. The signal of the periphery monitoring apparatus 20 is inputted into the controller 100. For example, the periphery monitoring apparatus 20 is an apparatus which monitors the periphery of vehicle, such as a camera and a radar. As the radar, a millimeter wave radar, a laser radar, an ultrasonic radar, and the like are used.

The traveling state detection apparatus 21 is an apparatus which detects a traveling state of the ego vehicle. The traveling state detection apparatus 21 detects a vehicle speed of the ego vehicle, a roll angular speed, a pitch angular speed, and a yaw angular speed of the ego vehicle, an acceleration in a longitudinal direction, an acceleration in a vertical direction, and an acceleration in a lateral direction, as the traveling state. For example, as the traveling state detection apparatus 21, a three axes angular speed sensor which detects the roll angular speed, the pitch angular speed, and the yaw angular speed acting on the ego vehicle, a three axes acceleration sensor which detects the acceleration in the longitudinal direction, the acceleration in the vertical direction, and the acceleration in the lateral direction, a speed sensor which detects a rotational speed of wheel, and the like are provided. In the present embodiment, at least, the vehicle speed, the yaw angular speed, and the acceleration in the lateral direction may be detected.

The position detecting apparatus 22 is an apparatus which detects the current position (latitude, longitude, altitude) of the ego vehicle, and a GPS antenna which receives the signal outputted from satellites, such as GNSS (Global Navigation Satellite System), is used. The wireless communication apparatus 23 performs a wireless communication with a base station, using the wireless communication standard of cellular communication system, such as 4G and 5G.

The automatic driving support apparatus 1 constitutes an electric power steering apparatus. The motor for steering 5 is an electric motor which drives a steering apparatus 8 of wheels 7. A rotation axis of the motor for steering 5 is connected with the steering apparatus 8 via a gearing system. The steering apparatus 8 is a mechanism which changes a steering angle of the wheels 7. The steering angle of the wheels 7 is changed by the rotation of the motor for steering 5. That is to say, the rotational angle of the motor for steering 5 and the steering angle are in a proportional relationship that a predetermined conversion ratio is multiplied between them.

In the present embodiment, the steering apparatus 8 is provided with a rack pinion gear 6. The rack pinion gear 6 converts a rotary motion of the steering shaft 4 into a linear motion in the lateral direction, drives a tie rod and a steering knuckle arm, and changes the steering angle of the wheels 7. The steering shaft 4 is connected with a handle 2. A torque sensor 3 which detects a steering torque of the handle 2 by a driver is provided in the steering shaft 4.

The rotation axis of the motor for steering 5 is connected with the steering shaft 4 via a gearing system, such as a worm gear mechanism. A rotation of the motor for steering 5 is converted with a gear ratio of the gearing system, and is transmitted to the steering shaft 4. The motor for steering 5 may be connected with the rack pinion gear 6 via the gearing system.

Figure 4:
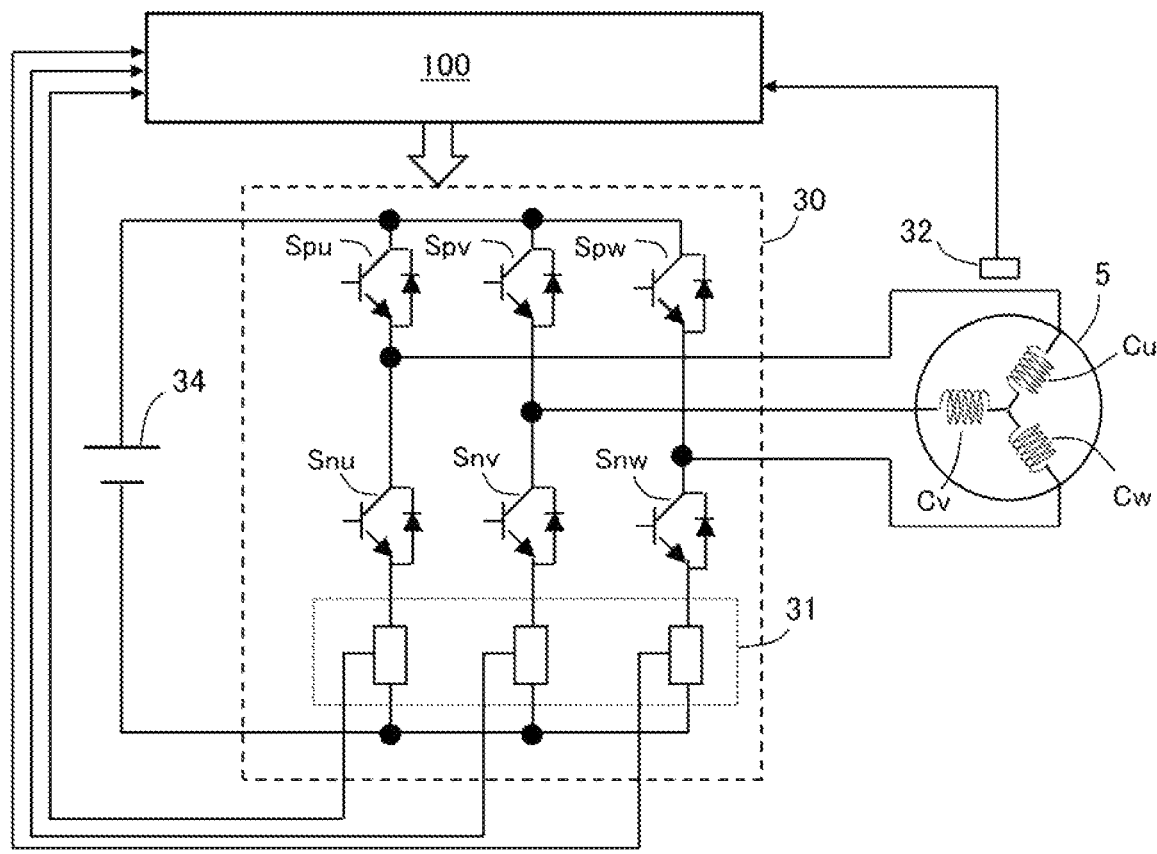
FIG. 4 is a circuit diagram of the motor drive circuit according to Embodiment 1.

As shown in FIG. 4, the motor for steering 5 is an AC motor which is provided with armature windings Cu, Cv, Cw of three-phase (U phase, V phase, W phase). The three-phase armature windings Cu, Cv, Cw are wound around a stator, and permanent magnets are provided in a rotor. The motor for steering 5 is a permanent magnet type synchronous motor. A rotation axis of the rotor is connected with the steering apparatus 8 via the gearing system. The motor for steering 5 may be a field winding type synchronous motor that a field winding is provided in the rotor, or may be an induction motor that a cage type conductor is provided in the rotor. The armature windings of three-phase or more may be provided.

The motor drive circuit 30 is provided with switching devices, and turns on and off a power supplied to the motor for steering 5. In the present embodiment, the motor drive circuit 30 is provided with the switching devices which turn on and off a voltage application to the armature winding of each phase. Specifically, the motor drive circuit 30 is provided with a series circuit in which a high potential side switching device Sp connected to the high potential side of the DC power source 34 and a low potential side switching device Sn connected to the low potential side of the DC power source 34 are connected in series, for each phase. And, a connection node of two switching devices in the series circuit of each phase is connected to the armature winding of the corresponding phase.

A current sensor 31 which detects a current which flows into the motor for steering 5 is provided. In the present embodiment, the current sensor 31 is provided in the series circuit of two switching devices of each phase. The current sensor 31 may be provided on a wire which connects the series circuit of two switching devices of each phase, and the armature winding of each phase. Alternatively, the current sensor 31 may be provided on the wire which connects the motor drive circuit 30 and the DC power source 34, and the current of the armature winding of each phase may be detected by well-known "bus line one-shunt system".

A rotation angle sensor 32 for detecting a rotational angle of the rotor is provided. Resolver, encoder, MR sensor or the like is used for the rotation angle sensor 32.

1-2. Controller

The controller 100 is provided with functional units of a steering method determination unit 110, an automatic steering control unit 120, a steering angle control unit 130, a steering assist control unit 140, a motor control unit 150, an abnormality detection unit 160, and the like. Each function of the controller 100 is realized by processing circuits provided in the controller 100. The controller 100 may be constituted by a plurality of controllers which communicate with each other.

Figure 5:
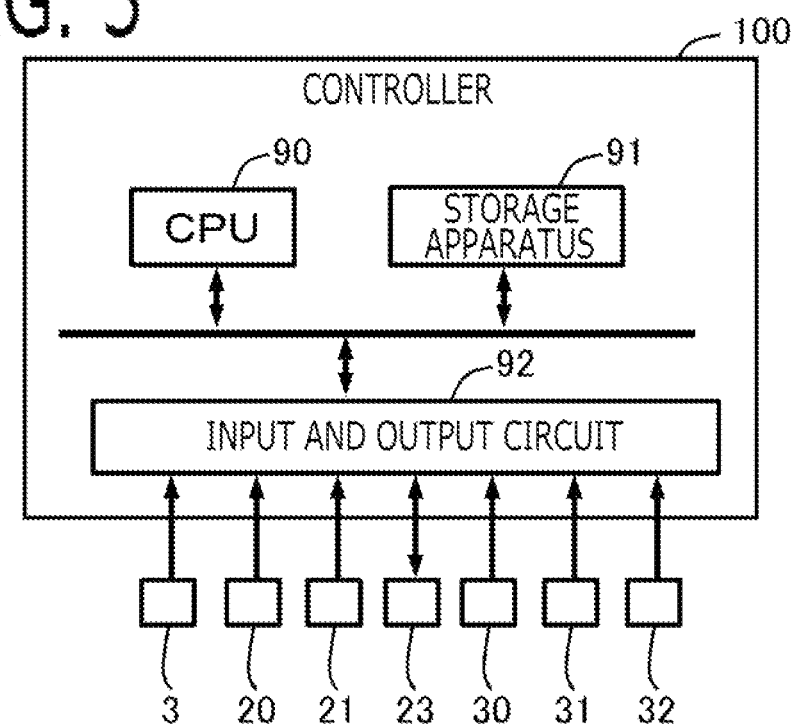
FIG. 5 is a hardware configuration diagram of the controller according to Embodiment 1.

For example, as shown in FIG. 5, the controller 100 is provided with an arithmetic processor 90 such as CPU (Central Processing Unit), storage apparatuses 91, an input and output circuit 92 which outputs and inputs external signals to the arithmetic 90, and the like. As the arithmetic processor 90, ASIC (Application Specific Integrated Circuit), IC (Integrated Circuit), DSP (Digital Signal Processor), FPGA (Field Programmable Gate Array), GPU (Graphics Processing Unit), AI (Artificial Intelligence) chip, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, various kinds of storage apparatuses, such as RAM (Random Access Memory), ROM (Read Only Memory), a flash memory, EEPROM (Electrically Erasable Programmable Read Only Memory), and a hard disk, are used.

The input and output circuit 92 is provided with a communication device, an A/D converter, an input/output port, a driving circuit, and the like. The input and output circuit 92 is connected to the torque sensor 3, the periphery monitoring apparatus 20, the traveling state detection apparatus 21, the position detection apparatus 22, the wireless communication apparatus 23, the motor drive circuit 30, the current sensor 31, the rotation angle sensor 32 and the like; and communicates signals with these apparatus.

Then, the arithmetic processor 90 runs software items (programs) stored in the storage apparatus 91 and collaborates with other hardware devices in the controller 100, such as the storage apparatus 91, and the input and output circuit 92, so that the respective functions of the functional units 110 to 160 provided in the controller 100 are realized. Setting data items, such as a determination value, a threshold value to be utilized in the functional units 110 to 160 are stored, as part of software items (programs), in the storage apparatus 91 such as a ROM.

1-2-1. Configuration of Steering Method Determination Unit at Normal Time

The steering method determination unit 110 determines whether an automatic steering is performed by the automatic steering control unit 120 and the steering angle control unit 130 or a steering assist of driver is performed. In the present embodiment, the steering method determination unit 110 determines whether the automatic steering is performed or the steering assist is performed, based on the detection value of the steering torque of the handle by the driver. The steering method determination unit 110 detects the steering torque by the torque sensor 3. The steering method determination unit 110 determines whether the automatic steering is performed or the steering assist is performed, based on a command of the driver through a human interface, and the like, as an initial determination. The steering method determination unit 110 determines to perform the steering assist, when a state where the absolute value of steering torque exceeded a preliminarily set determination value continues for a determination period during execution of the automatic steering.

1-2-2. Configuration of Automatic Steering Control Unit at Normal Time

When the automatic steering is determined to be performed, the automatic steering control unit 120 detects the traveling state of the ego vehicle, and the periphery state of the ego vehicle; and calculates the steering angle command value of the steering apparatus 8 of the ego vehicle, based on the detected traveling state and the detected periphery state.

Figure 6:
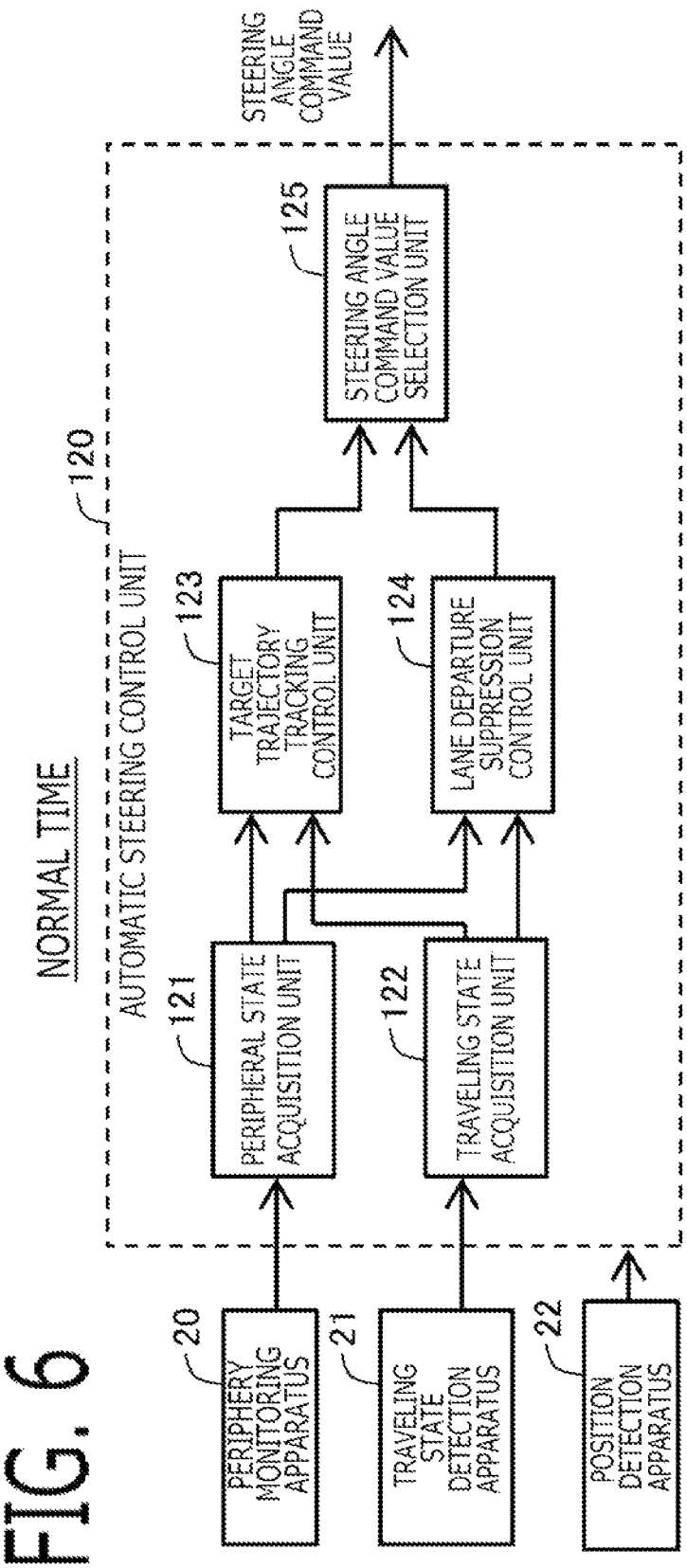
FIG. 6 is a block diagram of the automatic steering control unit at normal time according to Embodiment 1.

As shown in FIG. 6, the automatic steering control unit 120 is provided with a peripheral state acquisition unit 121, a traveling state acquisition unit 122, a target trajectory tracking control unit 123, a lane departure suppression control unit 124, a steering angle command value selection unit 125, and the like.

The peripheral state acquisition unit 121 detects the peripheral state of the ego vehicle. The peripheral state acquisition unit 121 detects a road shape, such as a lane marking of road, based on the detection information on the lane marking, such as a white line and a road shoulder, acquired from the periphery monitoring apparatus 20. The peripheral state acquisition unit 121 detects other vehicle, an obstacle, a pedestrian, and the like which exist around the ego vehicle, based on the detection information acquired from the periphery monitoring apparatus 20. The peripheral state acquisition unit 121 acquires the road information around the ego vehicle from the map information database stored in the storage apparatus 91 or the map information database of the external server, based on the position information on the ego vehicle acquired from the position detection apparatus 22.

The traveling state acquisition unit 122 detects the traveling state of the ego vehicle. The traveling state acquisition unit 122 acquires the vehicle speed of the ego vehicle, the roll angular speed, the pitch angular speed, and the yaw angular speed of the ego vehicle, the acceleration in the longitudinal direction, the acceleration in the vertical direction, and the acceleration in the lateral direction, from the traveling state detection apparatus 21, as the traveling state of the ego vehicle. The traveling state acquisition unit 122 may detect the vehicle speed, the yaw angular speed, and the acceleration in the lateral direction, at least. The traveling state acquisition unit 122 acquires the position of the ego vehicle, the traveling direction of the ego vehicle, and the like, based on the position information on the ego vehicle acquired from the position detection apparatus 22. The traveling state acquisition unit 122 acquires the information on the traveling position of the ego vehicle with respect to the lane, based on the shape of lane acquired from the peripheral state acquisition unit 121.

When the target trajectory tracking control is determined to be performed by the steering method determination unit 110 and the like, the target trajectory tracking control unit 123 generates the target traveling trajectory adjusted with the periphery state of the ego vehicle (for example, other vehicle, obstacle, road shape) detected by the peripheral state acquisition unit 121. The target traveling trajectory is a traveling trajectory which consists of a position of the ego vehicle, a traveling direction of the ego vehicle, a speed of the ego vehicle, and the like at future each time point. Various kinds of well-known methods are used for the generation of the target traveling trajectory. Various kinds of target traveling trajectories, such as a target traveling trajectory along the route to the destination, a target traveling trajectory for carrying out a lane change, and a target traveling trajectory for avoiding an obstacle, are included in the target traveling trajectory.

The target trajectory tracking control unit 123 calculates a steering angle command value for the ego vehicle to follow the target traveling trajectory, based on the target traveling trajectory, the traveling state of the ego vehicle, and the peripheral state of the ego vehicle. The target trajectory tracking control unit 123 calculates the steering angle command value, based on a position of the ego vehicle in the lateral direction with respect to the target traveling trajectory, an inclination of the longitudinal direction of the ego vehicle with respect to an extending direction of the target traveling trajectory, the vehicle speed, the yaw angular speed, and the acceleration in the lateral direction. Various kinds of well-known methods are used for calculation of the steering angle command value for following the target traveling trajectory.

When the lane departure suppression control is determined to be performed by the steering method determination unit 110 and the like, the lane departure suppression control unit 124 calculates the steering angle command value for the ego vehicle not to depart from the lane where the ego vehicle is traveling, and maintain, based on the traveling state of the ego vehicle, and the peripheral state of the ego vehicle. The lane departure suppression control unit 124 calculates the steering angle command value, based on the position of the ego vehicle in the lateral direction with respect to the traveling lane of the ego vehicle, the inclination of the longitudinal direction of the ego vehicle with respect to the extending direction of the traveling lane of the ego vehicle, the vehicle speed, the yaw angular speed, and the acceleration in the lateral direction. Various kinds of well-known methods are used for calculation of the steering angle command value for following the traveling lane.

When the target trajectory tracking control is determined to be performed, the steering angle command value selection unit 125 selects the steering angle command value calculated by the target trajectory tracking control unit 123, and transmits it to the motor control unit 150. When the lane departure suppression control is determined to be performed, the steering angle command value selection unit 125 selects the steering angle command value calculated by the lane departure suppression control unit 124, and transmits it to the motor control unit 150.

1-2-3. Configuration of Steering Angle Control Unit at Normal Time

Figure 7:
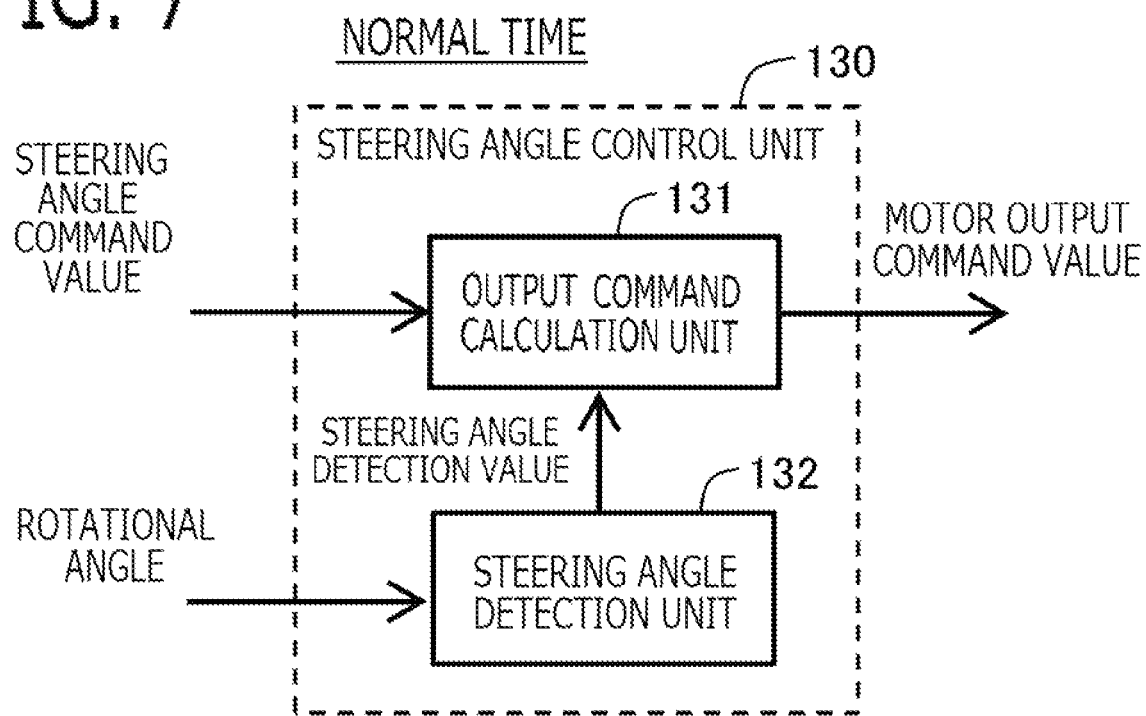
FIG. 7 is a block diagram of the steering angle control unit at normal time according to Embodiment 1.

The steering angle control unit 130 calculates the motor output command value related to the output torque of the motor for steering 5, based on the steering angle command value and the steering angle detection value. As shown in FIG. 7, the steering angle control unit 130 is provided with an output command calculation unit 131 and a steering angle detection unit 132. In the present embodiment, the steering angle detection unit 132 detects the steering angle, based on an integration value of the rotational angle of the motor for steering. Specifically, the steering angle detection unit 132 calculates the steering angle detection value by multiplying a conversion coefficient preliminarily set according to the gear ratio, to the integration value of the rotational angle. The integration value of the rotational angle when the steering angle is 0 is set to 0. Herein, the integration value of the rotational angle is an angle counted cumulatively, without the integration value being reset to 0 whenever it rotates one time except when the steering angle is 0.

The output command calculation unit 131 changes the motor output command value by a feedback control, such as PI control based on a deviation between the steering angle command value and the steering angle detection value. Various kinds of well-known controls may be used. In the present embodiment, the output command calculation unit 131 calculates a current command value of q-axis as the motor output command value. The output command calculation unit 131 may calculate a torque command value as the motor output command value.

1-2-4. Configuration of Steering Assist Control Unit at Normal Time

When the steering assist is determined to be performed, the steering assist control unit 140 calculates the motor output command value, based on the detection value of steering torque, instead of the automatic steering control unit 120 and the steering angle control unit 130. For example, the steering assist control unit 140 calculates the motor output command value by multiplying a conversion coefficient to the detection value of steering torque. In the present embodiment, the steering assist control unit 140 calculates the current command value of q-axis as the motor output command value. The steering assist control unit 140 may calculate the torque command value as the motor output command value.

1-2-5. Configuration of Motor Control Unit at Normal Time

Figure 8:
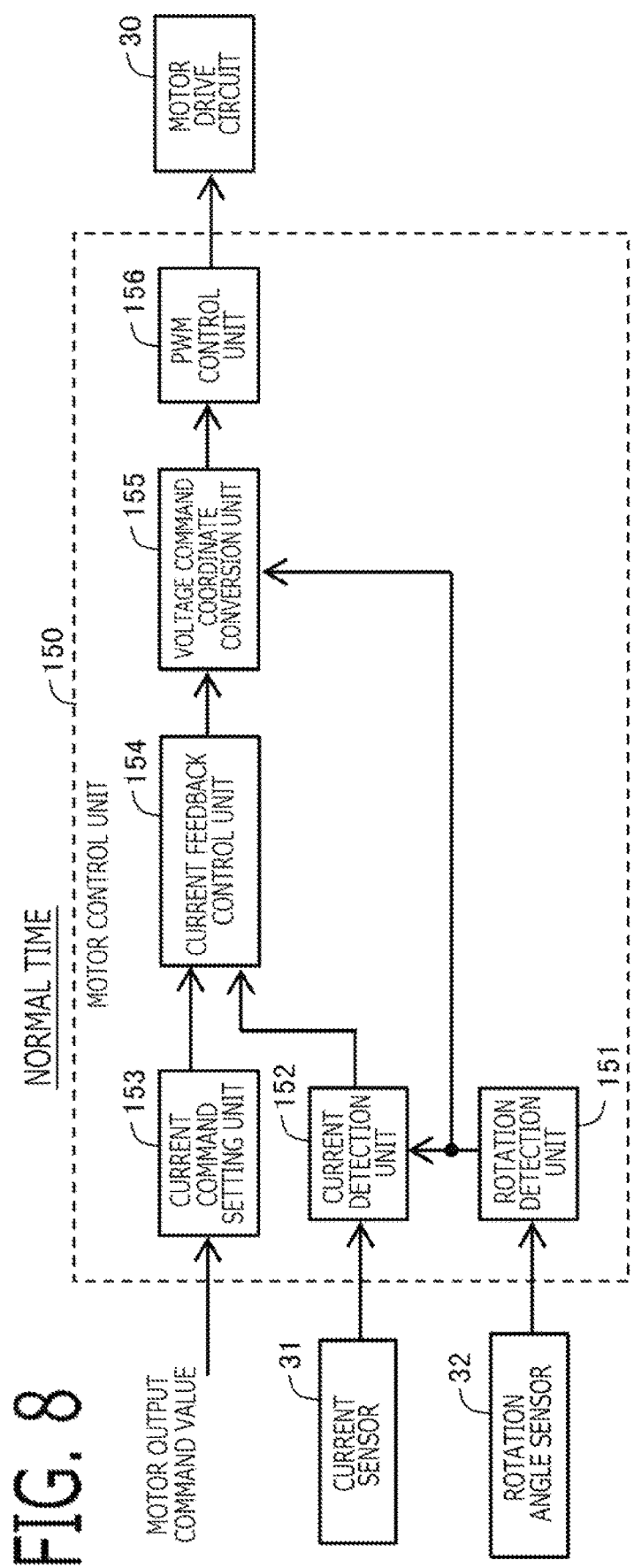
FIG. 8 is a block diagram of the motor control unit at normal time according to Embodiment 1.

The motor control unit 150 generates driving signals which make the switching devices of the motor drive circuit 30 turn on and off, based on the motor output command value. As shown in FIG. 8, the motor control unit 150 at normal time is provided with a rotation detection unit 151, a current detection unit 152, a current command setting unit 153, a current feedback control unit 154, a voltage command coordinate conversion unit 155, and a PWM control unit 156.

The current feedback control unit 154 performs a current feedback control that changes voltage command values applied to the armature windings so that the current detection values which flow into the armature windings approach the current command values which are set according to the motor output command value. The current feedback control unit 154 performs a vector control that changes the voltage command values on a dq-axis rotating coordinate system so that the current detection values approach the current command values. A d-axis is defined in the direction of the magnetic pole (the N pole, the magnetic pole position) of the rotor, and the q-axis is defined in the direction advanced to the d-axis by 90 degrees in the electrical angle.

The current command setting unit 153 sets a current command value of d-axis and a current command value of q-axis, based on the motor output command value. In the present embodiment, since the current command value of q-axis is transmitted as the motor output command value from the steering angle control unit 130, the current command setting unit 153 sets the current command value of d-axis so that the magnetic flux of the rotor becomes appropriate. When the torque command value is transmitted as the motor output command value from the steering angle control unit 130, the current command setting unit 153 sets the current command value of d-axis and the current command value of q-axis, based on the torque command value, the rotational angular speed, the power source voltage, and the like, according to various kinds of well-known vector control methods, such as the maximum torque/current control, the magnetic flux weakening control, the Id=0 control.

The rotation detection unit 151 detects the rotational angle (the magnetic pole position) in the electrical angle of the rotor, and the rotational angular speed, based on the output signal of the rotation angle sensor 32. The current detection unit 152 detects a current which flows into the armature winding of each phase, based on the output signal of the current sensor 31. The current detection unit 152 performs the three-phase/two-phase conversion and the rotating coordinate conversion, based on the rotational angle (the magnetic pole position), and converts the current detection values of three-phase into a current detection value of d-axis and a current detection value of q-axis. Then, the current feedback control unit 154 performs a current feedback control that changes a voltage command value of d-axis and a voltage command value of q-axis so that the current detection values of d-axis and q-axis approach the current command values of d-axis and q-axis, by PI control and the like.

The voltage command coordinate conversion unit 155 converts the voltage command values of d-axis and q-axis into the voltage command values of three-phase, by performing the fixed coordinate conversion and the two-phase/three-phase conversion, based on the rotational angle (the magnetic pole position). The PWM control unit 156 generates the driving signals which make each switching device of the motor drive circuit 30 turn on and off by PWM control (Pulse Width Modulation), based on the voltage command values of three-phase. Well-known carrier comparison PWM or space vector PWM is used for PWM control.

1-2-6. Configuration of Abnormality Detection Unit

The abnormality detection unit 160 detects various kinds of abnormalities of the automatic driving support apparatus. In the present embodiment, the abnormality detection unit 160 detects an abnormality related to the motor for steering which is an abnormality occurred in a control system of the motor for steering. There are a plurality of kinds of abnormalities related to the motor for steering, and these will be explained in the following.

<Detection of Circuit Abnormality of One Phase>

The abnormality detection unit 160 detects the circuit abnormality of any one phase as the abnormality related to the motor for steering. As explained in the following, there are an open circuit failure and a short circuit failure in the circuit abnormality of one phase.

When an open circuit failure of the switching device of any one phase, a disconnection of the current supply route of any one phase, or the like occurs in the motor drive circuit 30, it becomes impossible to supply current normally to the armature winding of one phase in which the open circuit failure occurred. Various kinds of well-known methods are used for a detecting method of the open circuit failure, and a specifying method of a faulted phase. For example, the abnormality detection unit 160 determines that the open circuit failure occurred in its phase, when a period when the current detection value of any one phase remains at 0 becomes a determination period or more. Alternatively, the abnormality detection unit 160 may determine the open circuit failure, based on the current detection value and a potential difference between the high potential side and the low potential side of each switching device when the driving signals for abnormality determination are outputted to the motor drive circuit 30.

When the short circuit failure of the switching device of any one phase, the short circuit of the current supply route of any one phase to the high potential side or the low potential side of the DC power source 34, or the like occurs in the motor drive circuit 30, it becomes impossible to supply current normally to the armature winding of one phase in which the short circuit failure occurred. Various kinds of well-known methods are used for a detecting method of the short circuit failure, and a specifying method of a faulted phase. For example, the abnormality detection unit 160 determines that the short circuit failure occurred in its phase, when a period when a magnitude of the current detection value of any one phase remains at a threshold value or more becomes a determination period or more, and a period when magnitudes of the current detection values of other phases remains at the threshold value or less becomes the determination period or more. Alternatively, the abnormality detection unit 160 may determine the short circuit failure, based on the current detection value and a potential difference between the high potential side and the low potential side of each switching device when the driving signals for abnormality determination are outputted to the motor drive circuit 30.

<Abnormality Detection of Current Sensor>

The abnormality detection unit 160 detects an abnormality of the current sensor 31 which detects a current supplied to the motor for steering (in this example, the armature winding) as the abnormality related to the motor for steering. Various kinds of well-known methods are used for a detecting method of the abnormality of the current sensor 31. For example, the abnormality detection unit 160 determines the abnormality of the current sensor 31, based on the current detection value when the driving signal for abnormality determination is outputted to the motor drive circuit 30. When the current sensor 31 which detects the current of each phase of three-phase is provided, the abnormality of the current sensor of each phase is detected.

<Abnormality Detection of Rotation Angle Sensor>

The abnormality detection unit 160 detects an abnormality of the rotation angle sensor 32 which detects the rotational angle of the motor for steering as the abnormality related to the motor for steering. Various kinds of well-known methods are used for a detecting method of the abnormality of the rotation angle sensor 32.

1-2-7. Control when Abnormality Related to the Motor for Steering is Detected

The motor control unit 150 generates the driving signals at abnormal time according to a content of the abnormality related to the motor for steering, based on the motor output command value, when the abnormality related to the motor for steering which is an abnormality which occurred in the control system of the motor for steering is detected. According to this configuration, even when the abnormality related to the motor for steering occurred, the driving signals at abnormal time are generated, the driving of the steering apparatus 8 by the motor for steering is continued, and the automatic steering or the steering assist can be continued.

1-2-7-1. Control when Circuit Abnormality of One Phase is Detected

The motor control unit 150 generates the driving signals which make the switching devices of the normal remaining plural phases turn on and off, based on the motor output command value, when the circuit abnormality of any one phase is detected as the abnormality related to the motor for steering. According to this configuration, even when the circuit abnormality of one phase is detected, the driving of the steering apparatus 8 by the motor for steering is continued by turning on and off the switching devices of the normal remaining plural phases, and the automatic steering or the steering assist can be continued.

<When Open Circuit Abnormality of One Phase is Detected>

Figure 9:
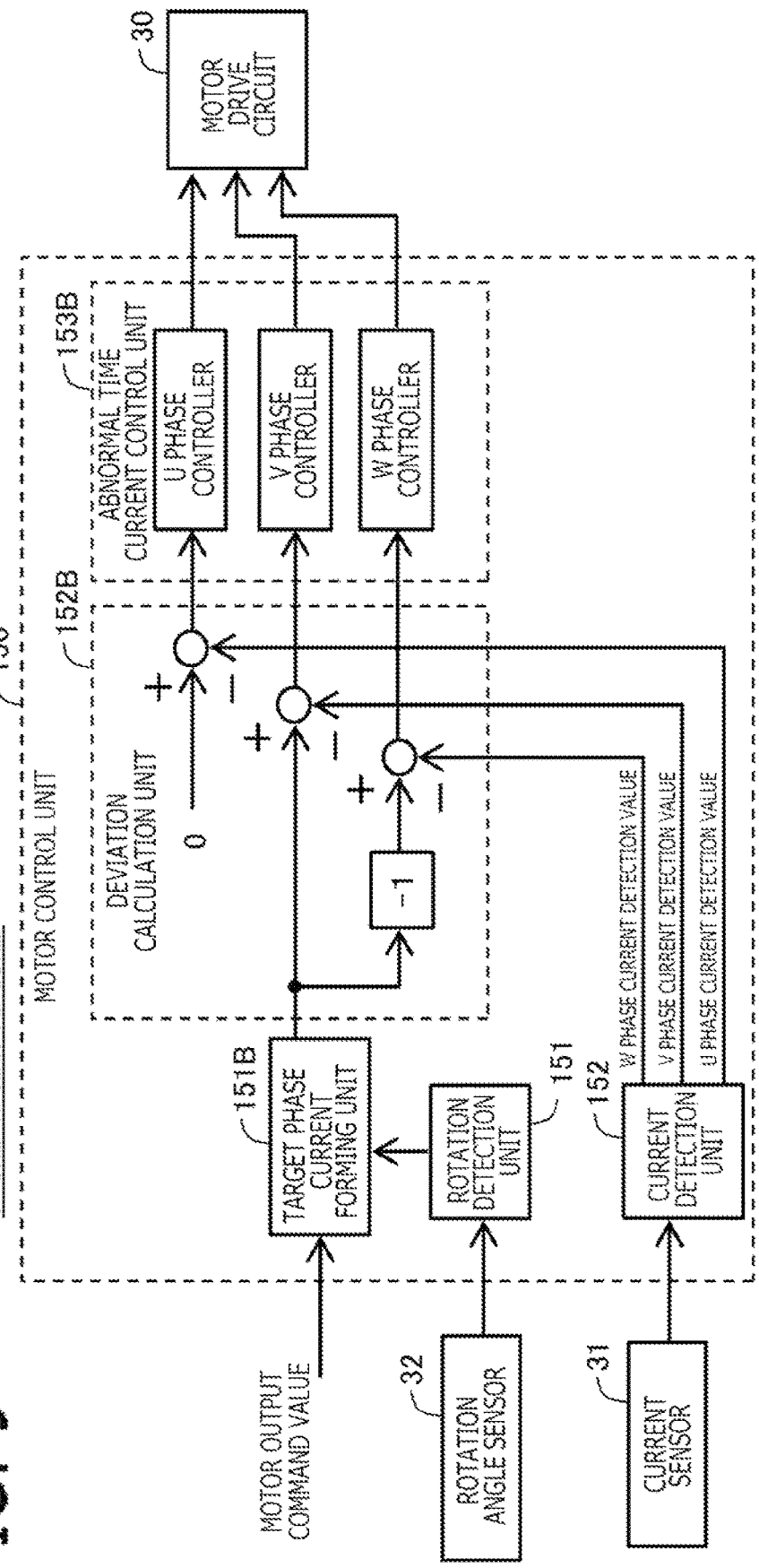
FIG. 9 is a block diagram of the motor control unit when the open circuit abnormality of one phase is detected, according to Embodiment 1.

When the open circuit abnormality of one phase is detected, for example, the method disclosed in JP 4498353 B may be used. Specifically, if configured similarly to the method of FIG. 3 of JP 4498353 B, the motor control unit 150 is provided with a target phase current forming unit 151B, a deviation calculation unit 152B, and an abnormal time current control unit 153B, as shown in FIG. 9. The target phase current forming unit 151B converts the current command value of q-axis into the current command values of normal two phases, based on the rotational angle θ. FIG. 9 shows a case where U phase is abnormal, and V phase and W phase are normal. Then, the deviation calculation unit 152B calculates a deviation between the current command value and the current detection value about each phase of normal two phases. The abnormal time current control unit 153B calculates a voltage command value based on the current deviation by a feedback control, such as PI control, about each phase of normal two phases; and generates the driving signals which make each switching device of each phase of normal two phases turn on and off by PWM control, based on the voltage command value of each phase of normal two phases. The abnormal time current control unit 153B generates the driving signal which make each switching device of abnormal one phase turn off constantly.

Figure 10:
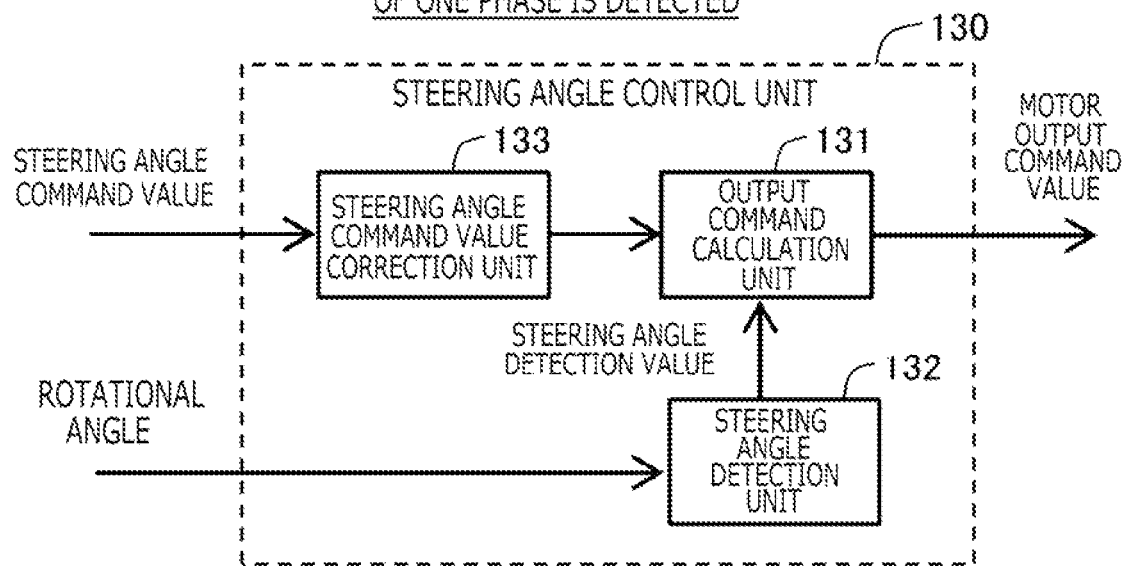
FIG. 10 is a block diagram of the steering angle control unit when the abnormality of one phase is detected, according to Embodiment 1.

As shown in FIG. 5 and FIG. 10 of JP 4498353 B, since it becomes impossible to supply current not only to the armature winding of abnormal one phase but also to the armature windings of normal two phases at a specific rotational angle corresponding to the abnormal phase, the motor for steering 5 cannot output torque, and the output torque drops to 0.

At abnormal time of U phase, when the rotational angle θ is 90 degrees or 270 degrees in the electrical angle, the output torque drops to 0. At abnormal time of V phase, when the rotational angle θ is 30 degrees or 210 degrees in the electrical angle, the output torque drops to 0. At abnormal time of W phase, when the rotational angle θ is 150 degrees or 330 degrees in the electrical angle, the output torque drops to 0.

As shown in FIG. 10, the steering angle control unit 130 is provided with a steering angle command value correction unit 133. When the abnormality of the open circuit of any one phase is detected, the steering angle command value correction unit 133 corrects the steering angle command value so as to avoid a torque reduction steering angle which is a steering angle corresponding to the rotational angle of the motor for steering where the output torque decreases corresponding to one phase that the abnormality of the open circuit occurred. Then, the output command calculation unit 131 calculates a motor output command value at abnormal time, based on the steering angle command value and the steering angle detection value after correction.

According to this configuration, since the steering angle is controlled so as to avoid the rotational angle where the output torque of the motor for steering decreases, it is suppressed to stop at the rotational angle where the output torque decreases. And even when the circuit abnormality of any one phase is detected, the motor for steering outputs torque, and the automatic steering or the steering assist can be continued.

Figure 11:
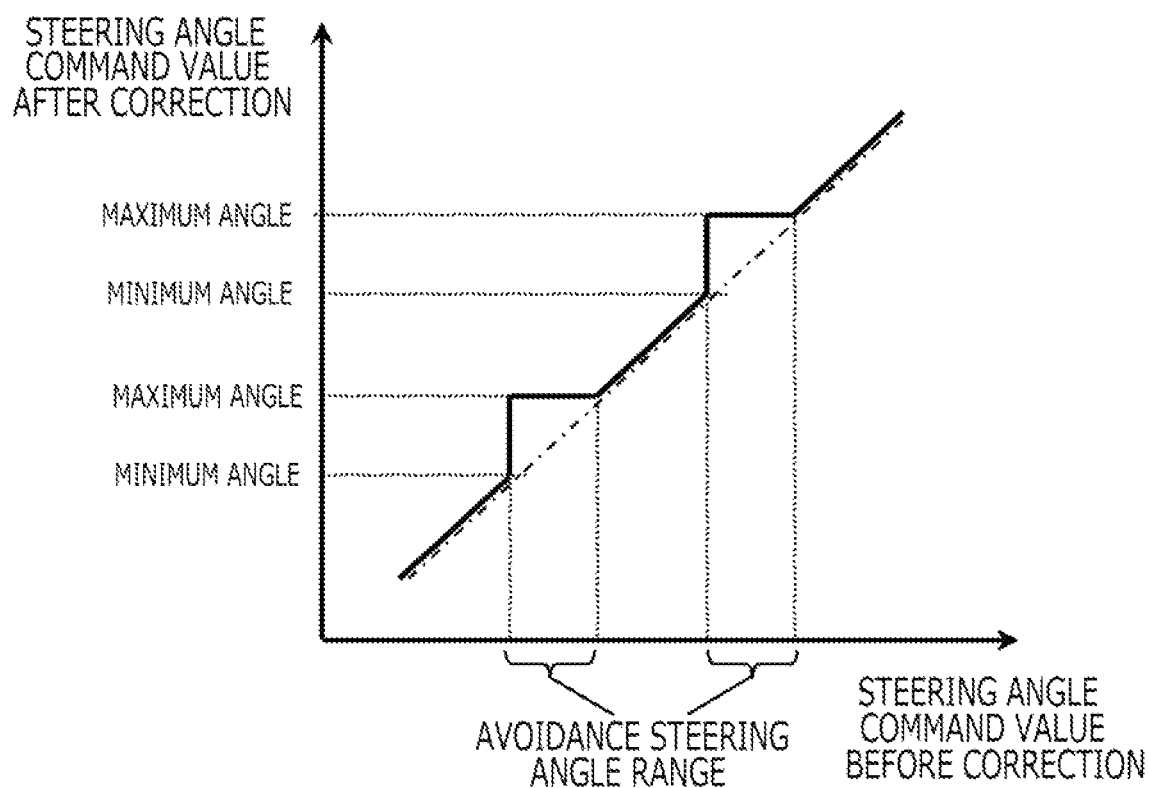
FIG. 11 is a figure for explaining the correction of the steering angle command value which avoids the torque reduction steering angle at abnormal time of one phase, according to Embodiment 1.

As described above, a value obtained by multiplying the conversion coefficient according to the gear ratio, to the integration value of the rotational angle becomes the steering angle. As described above, since the relation between the abnormal phase and the rotational angle $\theta$ where the output torque decreases when the open circuit abnormality of one phase occurs is known, a relation between the abnormal phase and the torque reduction steering angle where the output torque decreases can also be found. Then, the steering angle command value correction unit 133 sets the torque reduction steering angle, based on the abnormal phase. As shown in FIG. 11, when the steering angle command value calculated by the automatic steering control unit 120 is within an avoidance steering angle range centering on the torque reduction steering angle, the steering angle command value correction unit 133 changes the steering angle command value out of the avoidance steering angle range (for example, the maximum angle or the minimum angle of the avoidance steering angle range).

<When Short Circuit Abnormality of One Phase is Detected>

Figure 12:
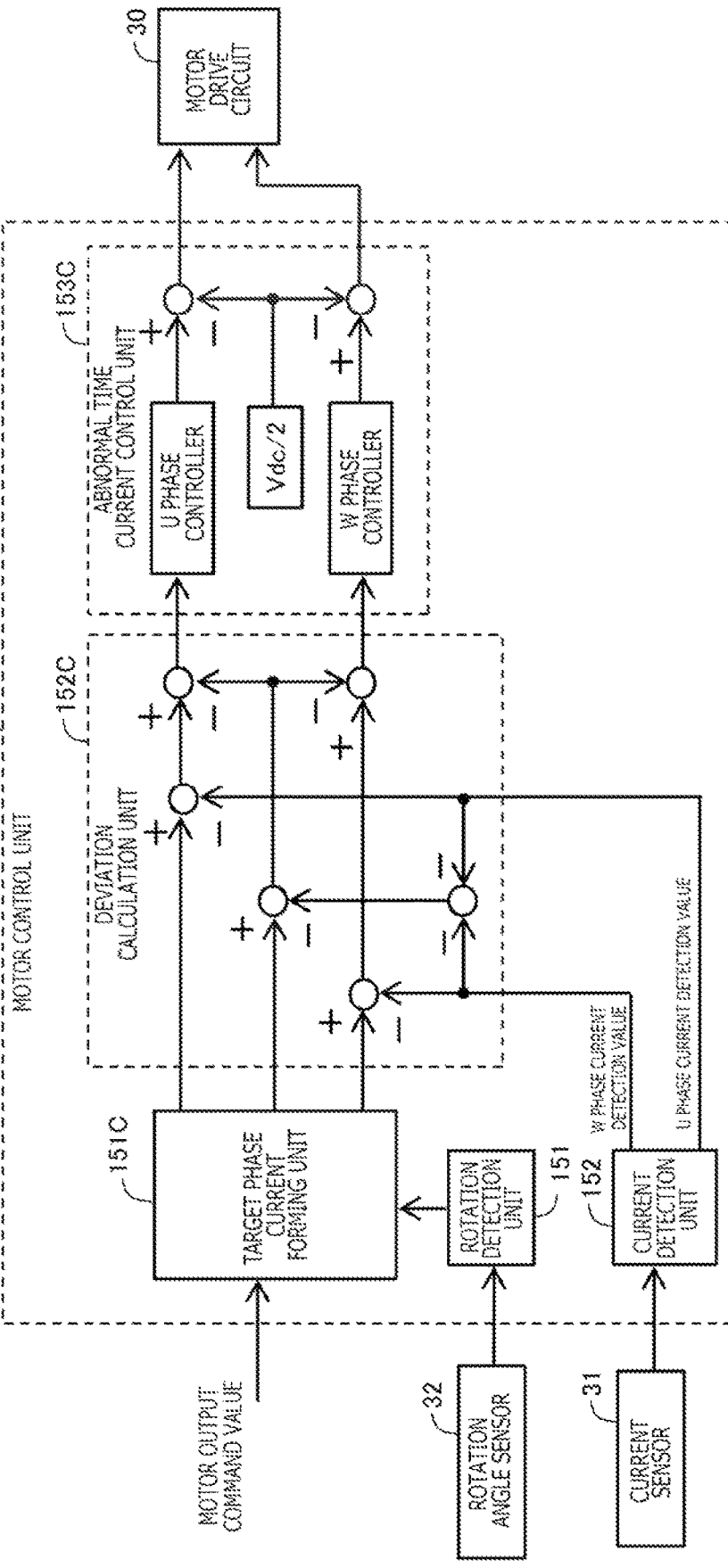
FIG. 12 is a block diagram of the motor control unit when the short circuit abnormality of one phase is detected, according to Embodiment 1.

When the short circuit abnormality of one phase is detected, the method disclosed in WO 2007/129359 A may be used, for example. Specifically, if configured similarly to the method of FIG. 3 of WO 2007/129359 A, the motor control unit 150 is provided with a target phase current forming unit 151C, a deviation calculation unit 152C, and an abnormal time current control unit 153C, as shown in FIG. 12. The target phase current forming unit 151C converts the current command value of q-axis into a current command value of each phase of three phases, based on the information on abnormal phase, and the rotational angle $\theta$. FIG. 12 shows a case where V phase is abnormal, and U phase and W phase are normal. Then, the deviation calculation unit 152C calculates a deviation between the current command value and the current detection value, about each phase of three phases. The deviation of abnormal one phase is subtracted from the deviation of each phase of normal two phases. About each phase of normal two phases, the abnormal time current control unit 153C calculates a feedback value, based on the current deviation after subtraction of the deviation of abnormal one phase, by feedback control, such as PI control; calculates a voltage command value by subtracting the half value of the power source voltage Vdc from the feedback value; and generates the driving signals which make each switching device of each phase of normal two phases turn on and off, based on the voltage command value of each phase of normal two phases, by PWM control. The abnormal time current control unit 153C generates the driving signal which make each switching device of abnormal one phase turn off constantly.

As shown in FIG. 5 of WO 2007/129359 A, in order to suppress occurrence of brake torque at specific rotational angles corresponding to abnormal phase, it becomes impossible to supply current also to the armature windings of normal two phases. Accordingly, the motor for steering 5 cannot output torque, and the output torque drops to 0.

At abnormal time of U phase, when the rotational angle $\theta$ is in a range from 240 degrees to 300 degrees in the electrical angle, the output torque drops to 0. At abnormal time of V phase, when the rotational angle $\theta$ is in a range from 0 degrees to 60 degrees in the electrical angle, the output torque drops to 0. At abnormal time of W phase, when the rotational angle $\theta$ is in a range from 120 degrees to 180 degrees in the electrical angle, the output torque drops to 0.

When the abnormality of the short circuit of any one phase is detected, the steering angle command value correction unit 133 corrects the steering angle command value so as to avoid a torque reduction steering angle which is a steering angle corresponding to the rotational angle of the motor for steering where the output torque decreases corresponding to one phase that the abnormality of the short circuit occurred. Then, the output command calculation unit 131 calculates a motor output command value at abnormal time, based on the steering angle command value and the steering angle detection value after correction.

According to this configuration, since the steering angle is controlled so as to avoid the rotational angle where the output torque of the motor for steering decreases, it is suppressed to stop at the rotational angle where the output torque decreases. And even when the circuit abnormality of any one phase is detected, the motor for steering outputs torque, and the automatic steering or the steering assist can be continued.

As described above, a value obtained by multiplying the conversion coefficient according to the gear ratio, to the integration value of the rotational angle becomes the steering angle. As described above, since the relation between the abnormal phase and the range of the rotational angle where the output torque decreases when the short circuit abnormality of one phase occurs is known, a relation between the abnormal phase and the range of the torque reduction steering angle where the output torque decreases can also be found. Then, the steering angle command value correction unit 133 sets the range of the torque reduction steering angle, based on the abnormal phase. As shown in FIG. 11, when the steering angle command value calculated by the automatic steering control unit 120 is within the range of the torque reduction steering angle, the steering angle control unit 130 changes the steering angle command value out of the range of the torque reduction steering angle (for example, the maximum angle or the minimum angle of the range of the torque reduction steering angle).

Accordingly, the steering angle command value correction unit 133 changes the torque reduction steering angle which should be avoided, based on a kind of circuit abnormality which is the open circuit abnormality or the short circuit abnormality, and the abnormal phase.

1-2-7-2. Control when Abnormality of Current Sensor is Detected

As mentioned above, the motor control unit 150 generates the driving signals based on the motor output command value and the current detection value detected by the current sensor, when the abnormality of the current sensor is not detected. On the other hand, the motor control unit 150 generates the driving signals based on the motor output command value without using the current detection value, when the abnormality of the current sensor is detected.

According to this configuration, even when the abnormality of the current sensor is detected, the motor for steering outputs torque, and the automatic steering or the steering assist can be continued.

Figure 13:
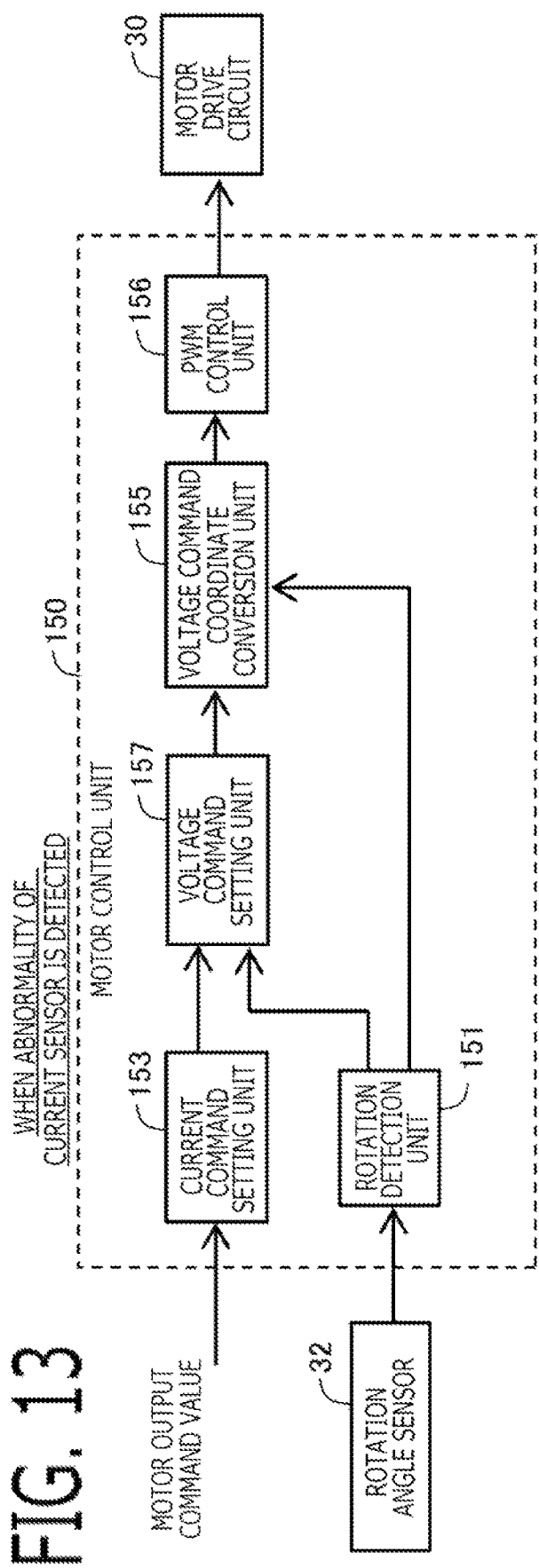
FIG. 13 is a block diagram of the motor control unit when the abnormality of the current sensor is detected, according to Embodiment 1.

In the present embodiment, as shown in FIG. 13, the motor control unit 150 when the abnormality of a current sensor is detected is provided with a rotation detection unit 151, a current command setting unit 153, a voltage command setting unit 157, a voltage command coordinate conversion unit 155, and a PWM control unit 156. The configuration of the rotation detection unit 151, the current command setting unit 153, and the voltage command coordinate conversion unit 155 is the same as the normal time.

The voltage command setting unit 157 calculates the voltage command values of d-axis and q-axis Vdo, Vqo, based on the current command values of d-axis and q-axis Ido, Iqo, using a voltage equation of motor shown in the next equation, when the abnormality of the current sensor is detected.

[Math. 1]

$$\begin{bmatrix} V_{do} \\ V_{qo} \end{bmatrix} = \begin{bmatrix} R+sL_d & -\omega L_q \\ \omega L_d & R+sL_q \end{bmatrix} \begin{bmatrix} I_{do} \\ I_{qo} \end{bmatrix} + \begin{bmatrix} 0 \\ \omega\varphi \end{bmatrix} \quad (1)$$

Herein, s is Laplace operator, R is a winding resistor, ψ is an interlinkage flux by the rotor magnet, Ld is a d-axis inductance, Lq is a q-axis inductance, and ω is a rotational angular speed in the electrical angle. The terms of the phase advance of Laplace operator s may be deleted. Various kinds of well-known methods may be used.

Then, similarly to the normal time, the voltage command coordinate conversion unit 155 converts the voltage command values of d-axis and q-axis Vdo, Vqo into the voltage command values of three-phase, by performing the fixed coordinate conversion and the two-phase/three-phase conversion, based on the rotational angle (the magnetic pole position). The PWM control unit 156 generates the driving signals which make each switching device of the motor drive circuit 30 turn on and off by PWM control (Pulse Width Modulation), based on the voltage command values of three-phase.

The current sensor 31 which detects the current of each phase of three phases is provided. When the abnormality of the current sensor of one phase is detected, the motor control unit 150 is configured similarly to the block diagram of FIG. 8 at normal time. The current detection unit 152 utilizes that a total of the current detection values of three-phase is become 0, and detects a value obtained by multiplying −1 to a total value of the current detection values of normal two phases, as the current detection value of abnormal one phase. In this case, using the current detection values of three-phase, the current feedback control of d-axis and q-axis similar to the normal time is performed. On the other hand, when the abnormality of the current sensors of two phases or more is detected, as shown in the block diagram of above FIG. 13, the driving signals are generated based on the motor output command value, without using the current detection values.

Figure 14:
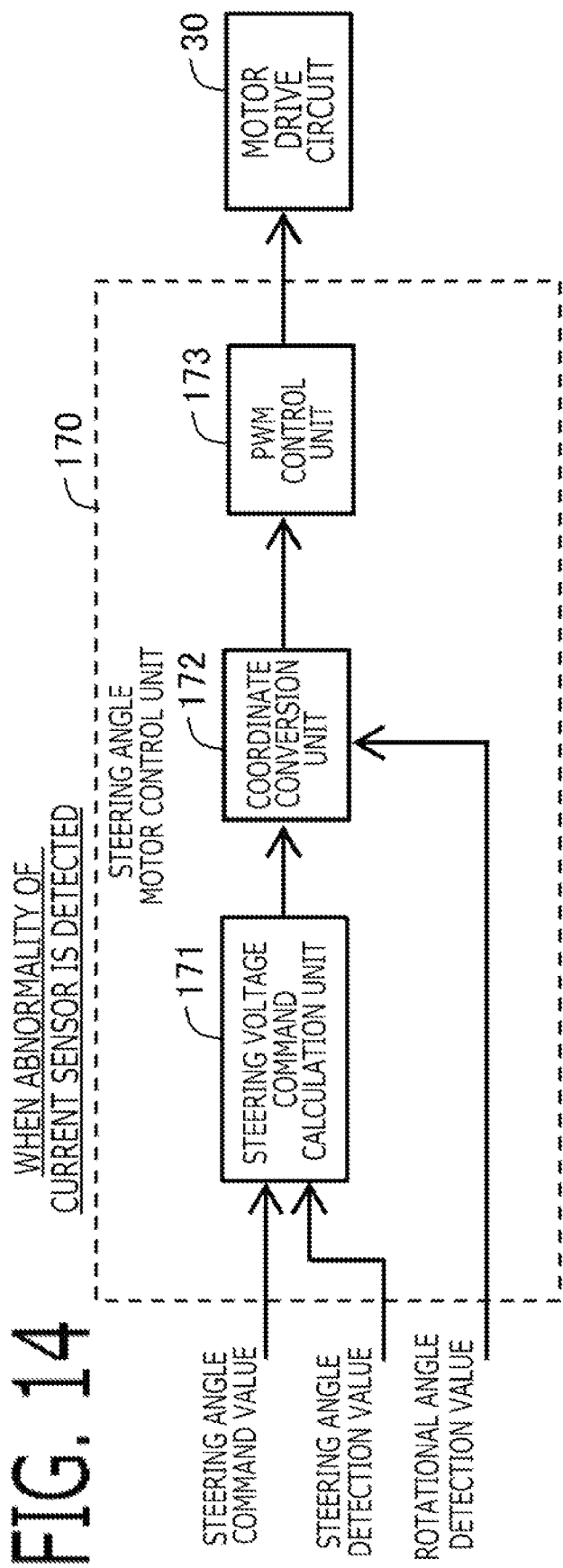
FIG. 14 is a block diagram of the steering angle motor control unit when the abnormality of the current sensor is detected, according to Embodiment 1.

Alternatively, when the abnormality of the current sensor is detected, the driving signals may be calculated by a steering angle motor control unit 170 which integrates the steering angle control unit 130 and the motor control unit 150. As shown in FIG. 14, the steering angle motor control unit 170 is provided with a steering voltage command calculation unit 171, a coordinate conversion unit 172, and a PWM control unit 173. The steering voltage command calculation unit 171 calculates the voltage command values of d-axis and q-axis, based on the steering angle command value and the steering angle detection value. The steering voltage command calculation unit 171 is provided with a feedback controller which changes a control value so that the steering angle detection value approaches the steering angle command value, and a phase advance unit which has a characteristic of an inverse model (R+s×L) of the motor. L is an inductance. The coordinate conversion unit 172 converts the voltage command values of d-axis and q-axis into the voltage command values of three-phase, by performing the fixed coordinate conversion and the two-phase/three-phase conversion, based on the rotational angle (the magnetic pole position). The PWM control unit 173 generates the driving signals which make each switching device of the motor drive circuit 30 turn on and off by PWM control (Pulse Width Modulation), based on the voltage command values of three-phase. According to this configuration, the control is appropriately performed at abnormal time of the current sensor 31 by the steering angle motor control unit 170 dedicated to the abnormal time of the current sensor 31.

1-2-7-3. Control when Abnormality of Rotation Angle Sensor is Detected

As mentioned above, when the abnormality of the rotation angle sensor 32 is not detected, the motor control unit 150 generates the driving signals based on the rotational angle detected by the rotation angle sensor 32. As mentioned above, when the abnormality of the rotation angle sensor 32 is not detected, the steering angle control unit 130 detects the steering angle, based on the integration value of the rotational angle detected by the rotation angle sensor 32, and calculates the motor output command value, based on the steering angle command value and the steering angle detection value.

On the other hand, when the abnormality of the rotation angle sensor 32 is detected, the motor control unit 150 estimates the rotational angle, based on the current which flows into the motor for steering, and generates the driving signals, based on the rotational angle estimation value. When the abnormality of the rotation angle sensor 32 is detected, the steering angle control unit 130 detects the steering angle, based on the integration value of the rotational angle estimated by the motor control unit 150, and calculates the motor output command value, based on the steering angle command value and the steering angle detection value. It is the same as the normal time other than the configuration that the rotational angle estimation value is used instead of the detection value of rotational angle.

According to this configuration, at abnormal time of the rotation angle sensor 32, the rotational angle is estimated, the motor control and the steering angle control are continued based on the rotational angle estimation value, and the automatic steering can be continued.

<Motor Control Unit at Abnormal Time of Rotation Angle Sensor>

Figure 15:
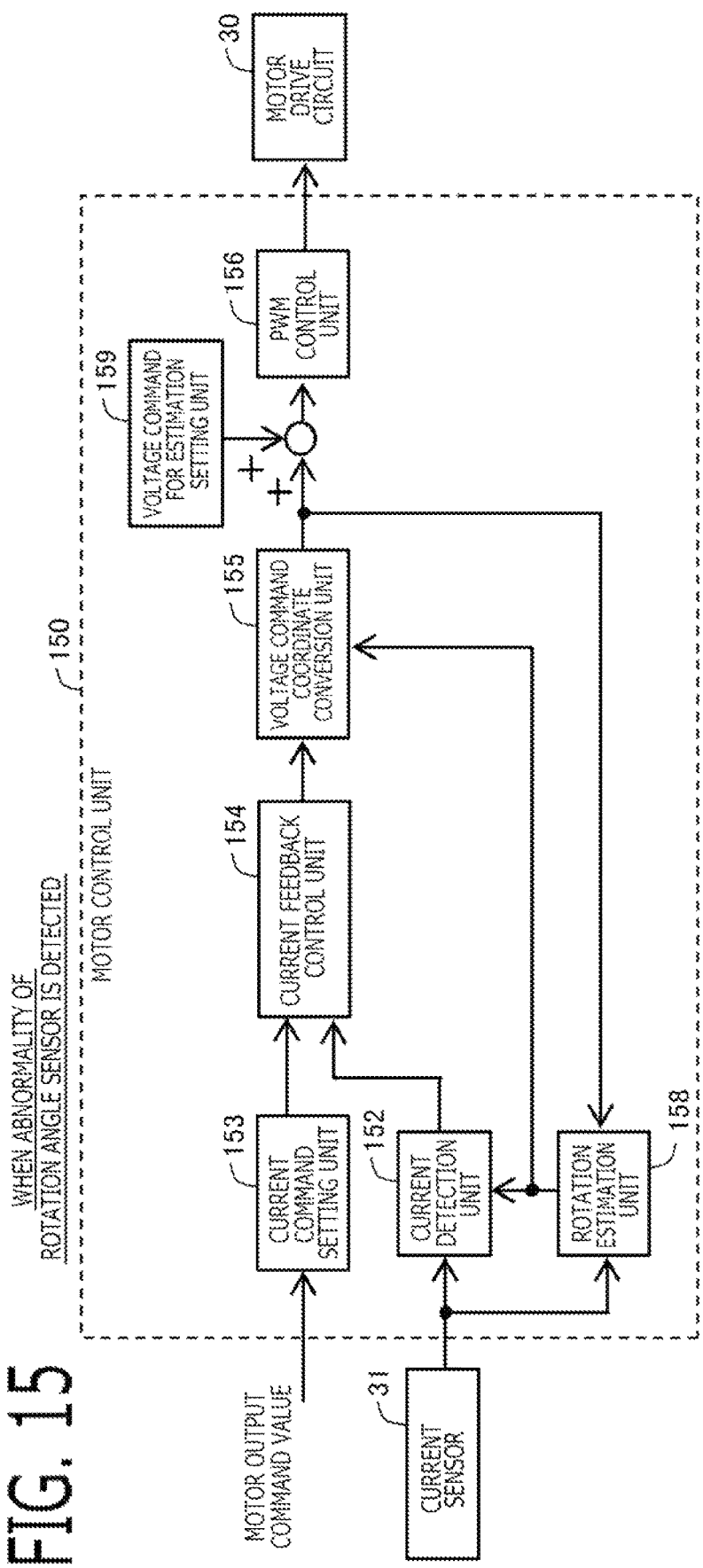
FIG. 15 is a block diagram of the motor control unit when the abnormality of the rotation angle sensor is detected, according to Embodiment 1.

For example, the method disclosed in JP 6203435 B may be used. As shown in FIG. 15, the motor control unit 150 when the abnormality of the rotation angle sensor is detected is provided with a rotation estimation unit 158, a voltage command for estimation setting unit 159, a current detection unit 152, a current command setting unit 153, a current feedback control unit 154, a voltage command coordinate conversion unit 155, and a PWM control unit 156. The current detection unit 152, the current command setting unit 153, the current feedback control unit 154, and the voltage command coordinate conversion unit 155 use the rotational angle estimation value estimated by the rotation estimation unit 158 instead of the detection value of rotational angle, and perform processing similar to the normal time.

The voltage command for estimation setting unit 159 calculates voltage command correction values of three-phase for angle estimation which become three-phase balance and have a frequency for angle estimation which is different from the rotational frequency. Then, the voltage command correction values of three-phase for angle estimation are added to the voltage command values of three-phase outputted from the voltage command coordinate conversion unit 155, and the voltage command values of three-phase after addition is inputted into the PWM control unit 156.

Figure 16:
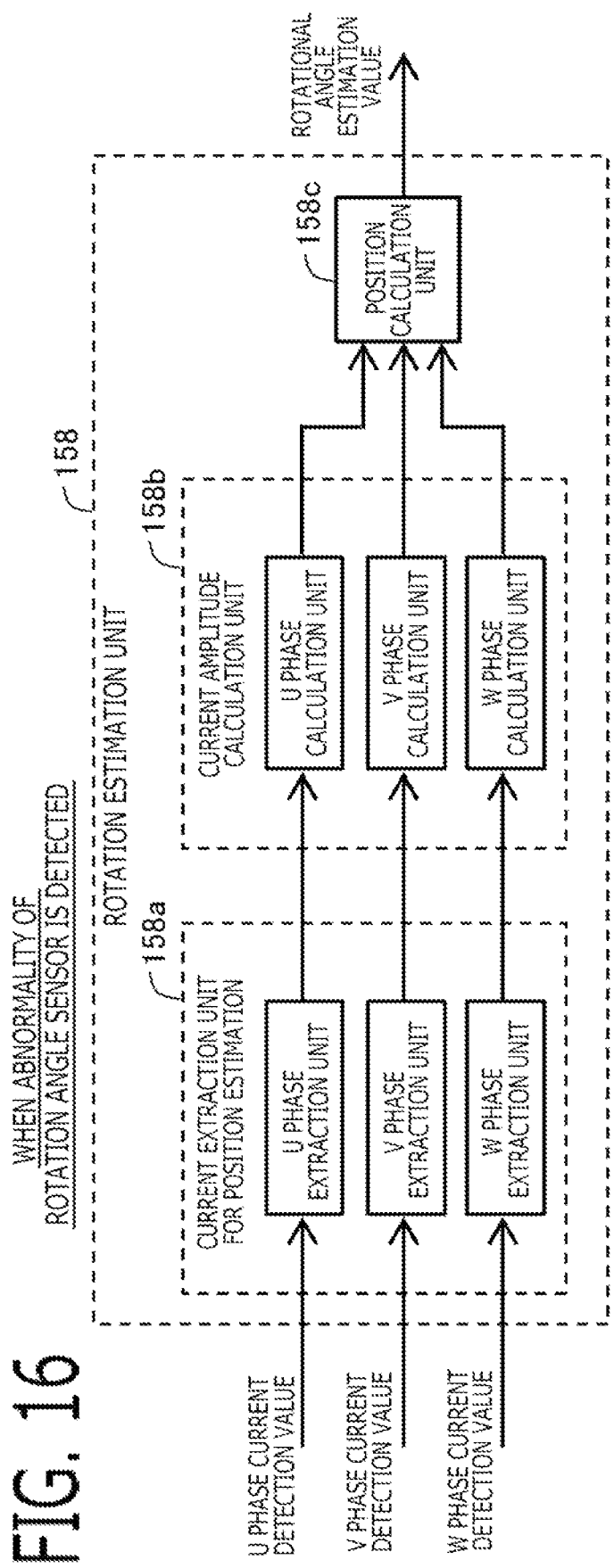
FIG. 16 is a block diagram of the rotation estimation unit of the motor control unit when the abnormality of the rotation angle sensor is detected, according to Embodiment 1.

The rotation estimation unit 158 may be configured similarly to FIG. 2 of JP 6203435 B. As shown in FIG. 16, the rotation estimation unit 158 is provided with a current extraction unit for position estimation 158*a*, a current amplitude calculation unit 158*b*, and a position calculation unit 158*c*. The current extraction unit for position estimation 158*a* performs a processing which extracts a component of the frequency for angle estimation to the current detection value of each phase. A band pass filter, a notch filter, or the like is used for this extraction processing. The current amplitude calculation unit 158*b* calculates an amplitude of the extracted component of the frequency for the angle estimation of each phase. Fourier transform or the equation (2) of JP 6203435 B is used for the calculation of amplitude. The position calculation unit 158*c* calculates a rotational angle estimation value, based on the amplitude of each phase. For example, the position calculation unit 158*c* converts the amplitudes of three-phase to amplitudes of two-phase, and then performs an inverse cosine calculation of a ratio of the amplitudes of two-phase, and calculates the rotational angle estimation value. A calculation method of the rotational angle estimation values other than this may be used.

Alternatively, the method disclosed in "Position Sensorless Control of PM Motor Using Adaptive Observer on Rotational Coordinates" (IEEJ Trans. IA, Vol. 123, No. 5, pp. 600-609 (2003-5)) may be used. FIG. 1, and the equation (1) to the equation (12) of this reference are used. The rotation estimation unit 158 has so-called adaptive observer. As the configuration of the adaptive observer, in the above reference, the state variables are set to the armature reaction Φs and the rotor magnetic flux Φr, the input variable is set to the voltage vs, and the output variable is set to the current is. The state variable may be set to the current is. If the state equation is set from these variables, the rotational angular speed w can be estimated, and the rotational angle estimation value θ is obtained by integrating the rotational angular speed ω.

Figure 17:
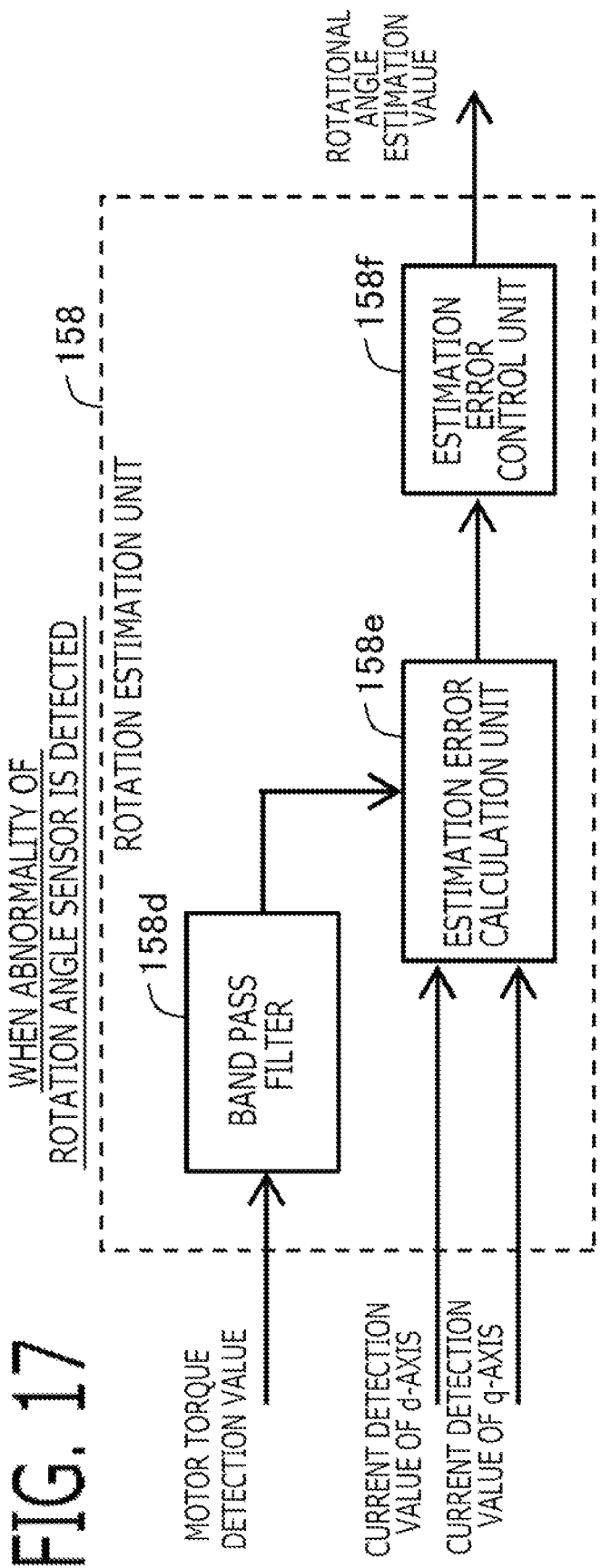
FIG. 17 is a block diagram of the rotation estimation unit of the motor control unit when the abnormality of the rotation angle sensor is detected, according to Embodiment 1.

Alternatively, the method disclosed in JP 6095851 B may be used. The estimation unit may be configured similarly to FIG. 2 of JP 6095851 B. As shown in FIG. 17, the rotation estimation unit 158 is provided with a band pass filter 158*d*, an estimation error calculation unit 158*e*, and an estimation error control unit 158*f*. The band pass filter 158*d* extracts a signal close to a frequency of high frequency currents on dq-axis, from the torque detection value detected by the torque sensor which detects the output torque of the motor for steering, and outputs as a high frequency output torque. The estimation error calculation unit 158*e* calculates a rotational angle estimation error which is a phase difference between the actual dq-axis based on the actual rotational angle, and the estimated dq-axis based on the rotational angle estimation value, based on the high frequency currents on dq-axis and the high frequency output torque. Herein, the estimation error calculation unit 158*e* consists of a multiplier, an integrator, and an angle error estimator. The multiplier multiplies the high frequency output torque to each of the high frequency currents on dq-axis, and outputs products on dq-axis. The integrator time-integrates each of the products on dq-axis during an interval corresponding to one-cycle of the high frequency currents on dq-axis, and outputs correlation values on dq-axis. The angle error estimator performs an arc tangent calculation of a value obtained by dividing the correlation value on d-axis by the correlation value on q-axis, and outputs as the rotational angle estimation error. The estimation error control unit 158*f* is configured by PI controller, and calculates the rotational angle estimation value so that the rotational angle estimation error becomes zero. In this way, the rotation estimation unit 158 calculates the rotational angle estimation value, based on the high frequency currents on dq-axis, and the torque detection value output by the output torque sensor.

Modified Example of Steering Angle Estimation at Abnormal Time of Rotation Angle Sensor When the abnormality of the rotation angle sensor 32 is detected, the steering angle control unit 130 estimates the steering angle based on the detected traveling state, and calculates the motor output command value based on the steering angle command value and the steering angle detection value. Other than the configuration of the steering angle detection unit 132 which estimates the steering angle, it is the same as the normal time.

When the abnormality of the rotation angle sensor 32 is detected, the steering angle detection unit 132 estimates the steering angle, based on the vehicle speed and the yaw acceleration as the traveling state. For example, since the yaw acceleration becomes a predetermined relation proportional to each of the steering angle and the vehicle speed, the steering angle can be estimated using this proportional relationship. Alternatively, if rotational speeds of right and left wheels are detected respectively as the vehicle speed, the steering angle detection unit 132 may estimate the steering angle based on a rotational speed difference between right and left wheels.

Modified Example 1 of Calculation of Motor Output Command Value at Detection Abnormality of Steering Angle Detection Value Alternatively, when the detection abnormality of the steering angle detection value is detected (in this example, when the abnormality of the rotation angle sensor is detected), the automatic steering control unit 120 may calculate the motor output command value, based on the detected periphery state, without using the steering angle detection value, instead of the steering angle control unit 130. The automatic steering control unit 120 detects a lateral direction position of the ego vehicle with respect to a traveling lane, based on the detected periphery state, and calculates the motor output command value, based on a target lateral direction position and the detected lateral direction position.

Figure 18:
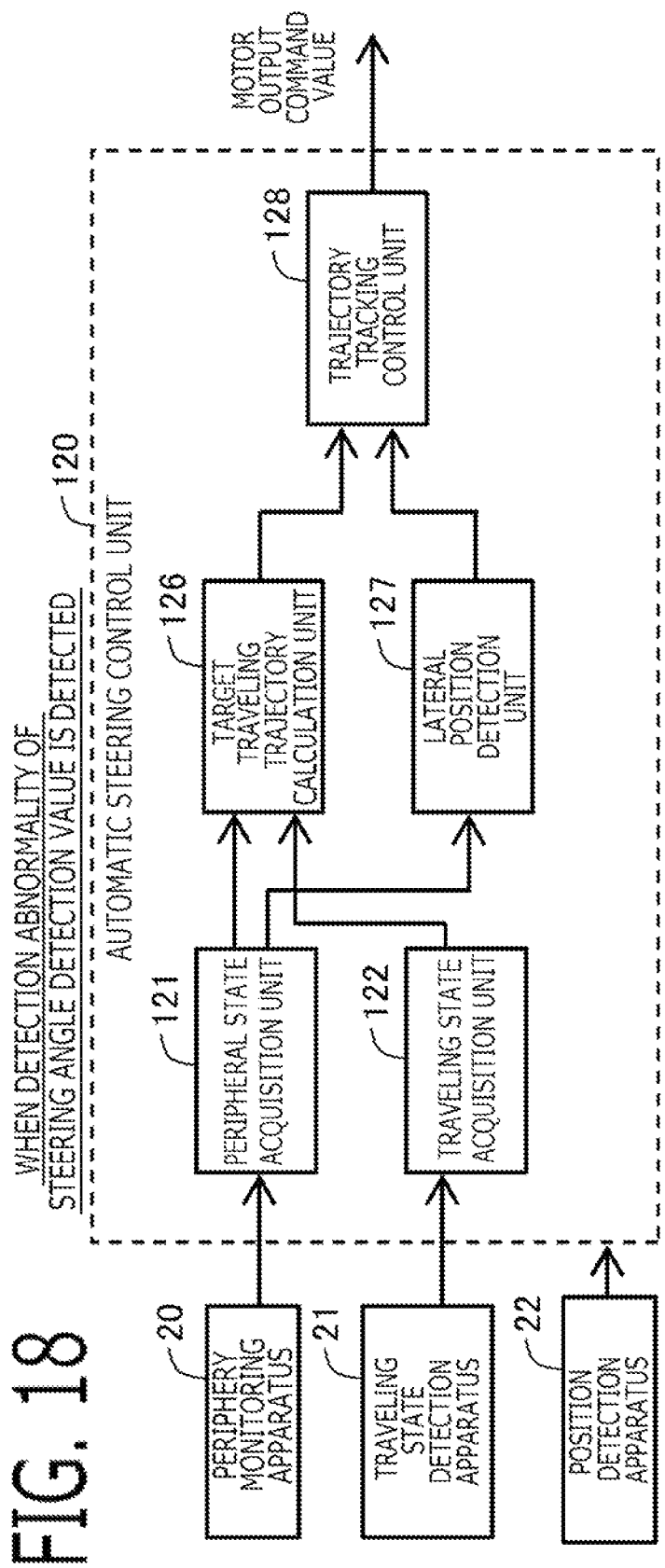
FIG. 18 is a block diagram of the automatic steering control unit when the detection abnormality of the steering angle detection value is detected, according to Embodiment 1.

As shown in FIG. 18, the automatic steering control unit 120 when the detection abnormality of the steering angle detection value is detected is provided with a target traveling trajectory calculation unit 126, a lateral position detection unit 127, and a trajectory tracking control unit 128. The target traveling trajectory calculation unit 126 generates the target traveling trajectory, similarly to the automatic steering control unit 120 at normal time. The lateral position detection unit 127 detects a lateral direction position of the ego vehicle with respect to a lane, based on the detected periphery state. For example, the lateral direction position of the ego vehicle with respect to right and left division lines is detected, based on the detection information on the periphery monitoring apparatus 20, such as the camera. The trajectory tracking control unit 128 calculates a deviation of the lateral direction position of the ego vehicle with respect to a lateral direction position of the target traveling trajectory; and calculates the motor output command value based on the deviation of the lateral direction position. For example, the trajectory tracking control unit 128 performs a feedback control which changes the motor output command value so that the deviation of the lateral direction position decreases. By performing a phase advance processing like a differential control when calculating the motor output command value, a following response can be improved.

Modified Example 2 of Calculation of Motor Output Command Value at Detection Abnormality of Steering Angle Detection Value Alternatively, when the detection abnormality of the steering angle detection value is detected (in this example, when the abnormality of the rotation angle sensor is detected), the steering angle control unit 130 may calculate the motor output command value, based on the steering angle command value, without using the steering angle detection value.

Figure 19:
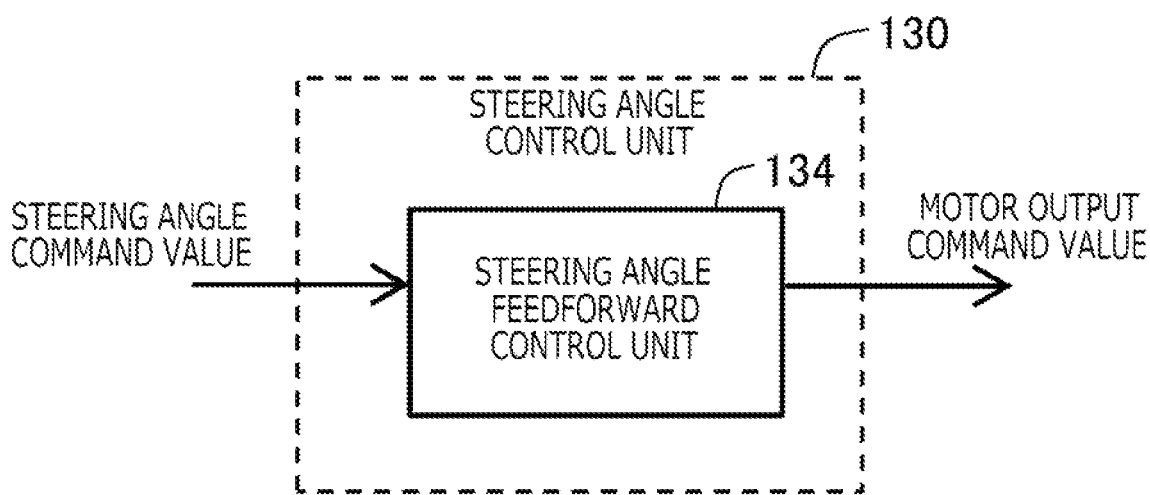
FIG. 19 is a block diagram of the steering angle control unit when the detection abnormality of the steering angle detection value is detected, according to Embodiment 1.

As shown in FIG. 19, the steering angle control unit 130 when the detection abnormality of the steering angle detection value is detected is provided with a steering angle feedforward control unit 134. The steering angle feedforward control unit 134 calculates the motor output command value in a feedforward manner, based on the steering angle command value, without using the steering angle detection value. A relation between the steering angle δ and the motor current of q-axis Iq can be expressed like the next equation.

[Math. 2]

$$Tmot = Kt \times Iq = J \times \ddot{\delta} + C \times \dot{\delta} + k \quad (2)$$

Herein, Tmot is the output torque of the motor for steering, Kt is a torque constant that converts from current to torque, J is an inertia of the steering mechanism, C is a viscosity of the steering mechanism, and k is a spring constant that linearly approximates the inertia, the viscosity, and a road surface reaction force.

Accordingly, using the next equation obtained by Laplace transforming the equation (2) and deforming it, the steering angle feedforward control unit 134 calculates the current command value of q-axis Iqo by performing a feedforward calculation processing to the steering angle command value do. The steering angle feedforward control unit 134 may calculate the torque command value by multiplying the torque constant Kt to the current command value of q-axis Iqo.

[Math. 3]

$$Iqo = \frac{J \times s^2 + C \times s + k}{Kt} \delta o \quad (3)$$

2. Embodiment 2

Figure 20:
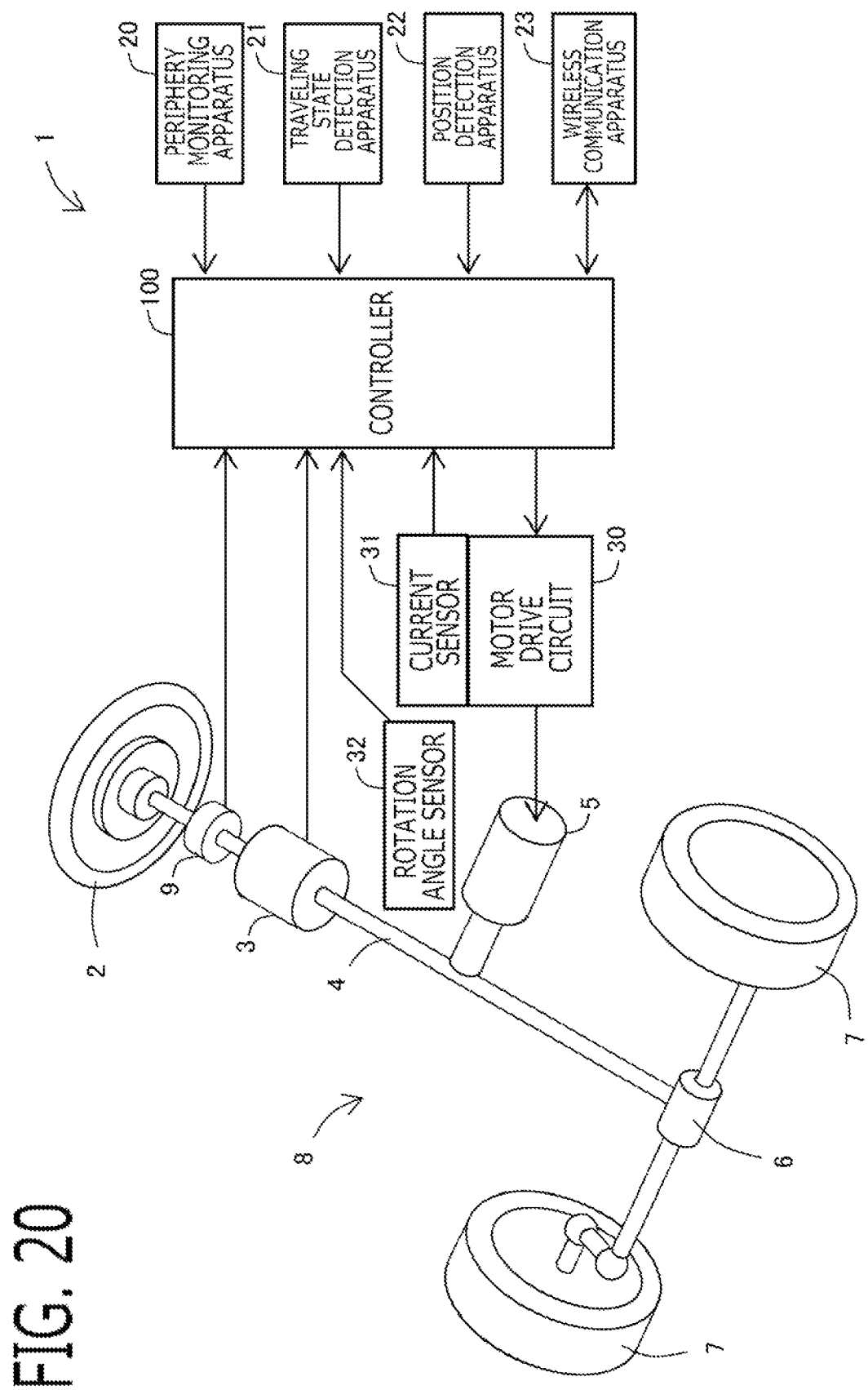
FIG. 20 is a schematic configuration diagram of the automatic driving support apparatus according to Embodiment 2.
Figure 21:
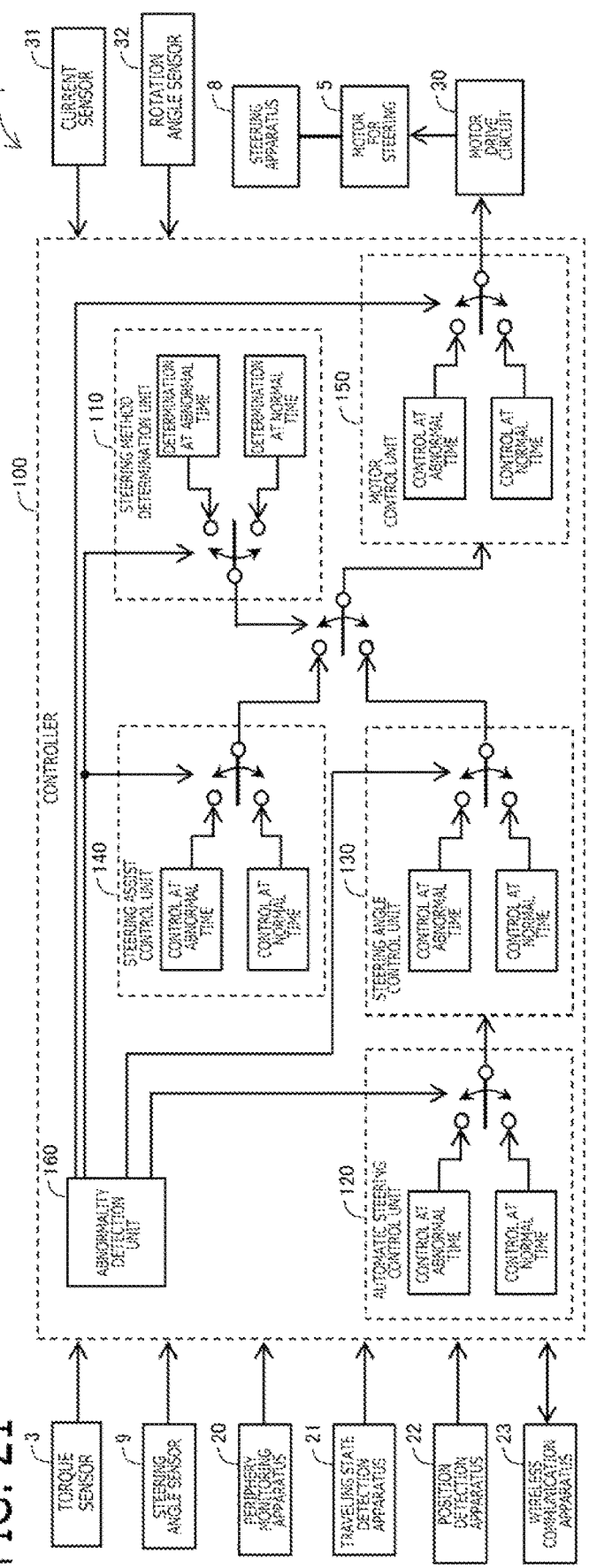
FIG. 21 is a schematic block diagram of the automatic driving support apparatus according to Embodiment 2.

The automatic driving support apparatus 1 according to Embodiment 2 will be explained with reference to drawings. The explanation for constituent parts the same as those in Embodiment 1 will be omitted. The basic configuration of the automatic driving support apparatus 1 according to the present embodiment is the same as that of Embodiment 1. Embodiment 2 is different from Embodiment 1 in that the steering angle sensor 9 is provided and accordingly, each processing is changed. FIG. 20 shows a schematic configuration diagram of the automatic driving support apparatus 1, and FIG. 21 shows a schematic block diagram of the automatic driving support apparatus 1. FIG. 22 shows a figure in which processings when the abnormality of each sensor is detected are summarized. Processing other than processing when the abnormality related to the steering angle sensor 9 is detected are the same as Embodiment 1.

In the present embodiment, the automatic driving support apparatus 1 is provided with a steering angle sensor 9 which detects the steering angle of the steering apparatus 8 (wheel). The output signal of the steering angle sensor 9 is inputted into the controller 100. The steering angle sensor 9 is attached to the steering shaft 4, and detects the rotational angle of the steering shaft 4. Similarly to the torque sensor 3, the steering angle sensor 9 is attached to a part of the steering shaft 4 between the motor for steering 5 and the handle 2.

The rotational angle of the steering shaft 4 and the steering angle are in a proportional relationship that a predetermined conversion ratio is multiplied between them. The steering angle sensor 9 may be attached to other part, such as the rack pinion gear 6, where the steering angle can be detected. In the present embodiment, the steering angle sensor 9 is a high resolution sensor which can detect several degrees change of the rotational angle.

The abnormality detection unit 160 detects an abnormality of the steering angle sensor 9. Various kinds of well-known methods are used for a detecting method of the abnormality of the steering angle sensor 9.

<Configuration of Steering Angle Control Unit at Normal Time of Steering Angle Sensor>

Figure 23:
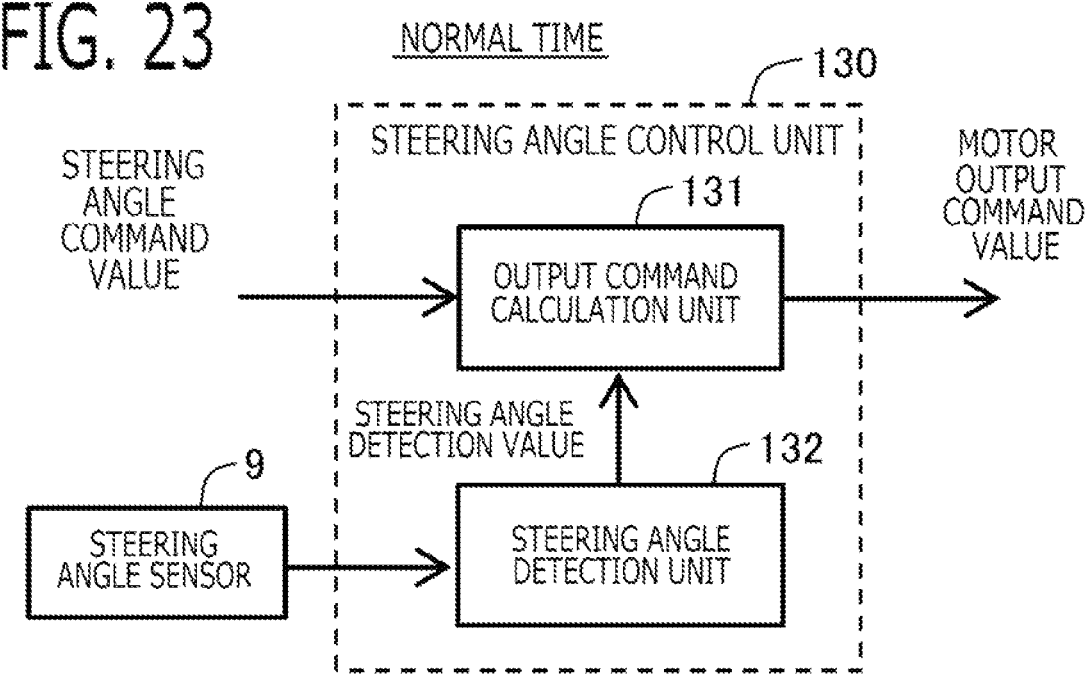
FIG. 23 is a block diagram of the steering angle control unit at normal time according to Embodiment 2.

Similarly to Embodiment 1, the steering angle control unit 130 calculates the motor output command value related to the output torque of the motor for steering 5, based on the steering angle command value and the steering angle detection value. As shown in FIG. 23, the steering angle control unit 130 is provided with an output command calculation unit 131 and a steering angle detection unit 132. In the present embodiment, the steering angle detection unit 132 detects the steering angle by the steering angle sensor 9, when the abnormality of the steering angle sensor 9 is not detected. Specifically, the steering angle detection unit 132 calculates the steering angle detection value by multiplying a predetermined conversion ratio to the rotational angle of the steering shaft 4 detected by the steering angle sensor 9. The rotational angle when the steering angle is 0 is set to 0. In the present embodiment, since the steering angle sensor 9 is the high resolution sensor, the steering angle detection value detected by the output signal of the steering angle sensor 9 may be used as it is, but the steering angle detection value to which a smoothing processing, such as a low pass filter or a PLL filter is performed may be used.

Similarly to Embodiment 1, the output command calculation unit 131 changes the motor output command value (in this example, the current command value of q-axis) by a feedback control, such as PI control based on a deviation between the steering angle command value and the steering angle detection value.

<Configuration of Steering Angle Control Unit when Abnormality of Steering Angle Sensor is Detected>

Figure 24:
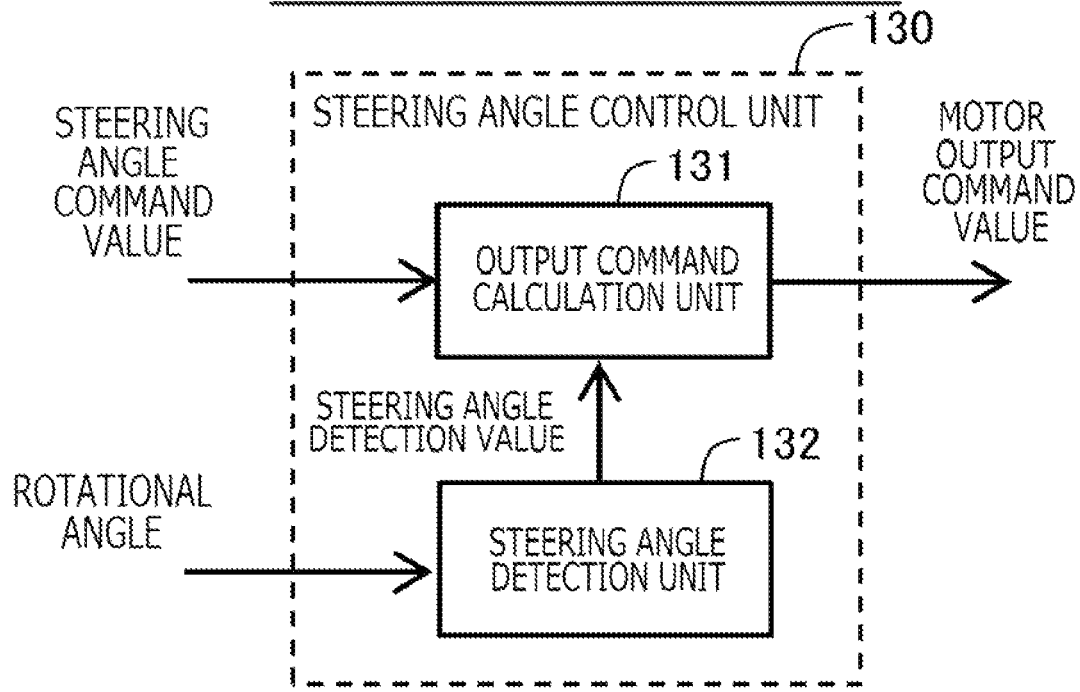
FIG. 24 is a block diagram of the steering angle control unit when the abnormality of the steering angle sensor is detected, according to Embodiment 2.

As shown in FIG. 24, the steering angle detection unit 132 detects the steering angle, based on an integration value of the rotational angle of the motor for steering, when the abnormality of the steering angle sensor 9 is detected. Specifically, the steering angle detection unit 132 calculates the steering angle detection value by multiplying a conversion coefficient preliminarily set according to the gear ratio, to the integration value of the rotational angle. The integration value of the rotational angle when the steering angle is 0 is set to 0. The steering angle detection unit 132 acquires the rotational angle of the motor for steering 5 detected or estimated by the motor control unit 150, and integrates it. When the steering angle sensor 9 is operating normally, the steering angle detection unit 132 stores a correspondence relation between the steering angle detection value detected by the steering angle sensor 9, and the integration value of the rotational angle. When the abnormality of the steering angle sensor 9 is detected, the steering angle detection unit 132 calculates the steering angle detection value based on the integration value of the rotational angle using the correspondence relation stored at the normal time. For example, when the steering angle sensor 9 is normal, the steering angle detection unit 132 sets the integration value of the rotational angle when the steering angle detection value detected by the steering angle sensor 9 is 0, to 0; and calculates the integration value of the rotational angle on the basis of 0.

Similarly to Embodiment 1, when the abnormality of the rotation angle sensor 32 is not detected, the rotational angle of the motor for steering 5 detected by the rotation angle sensor 32 is used. And, when the abnormality of the rotation angle sensor 32 is detected, the rotational angle of the motor for steering 5 estimated by the motor control unit 150 is used.

According to the above configuration, even when the abnormality of the steering angle sensor 9 occurs, the steering angle detection value is calculated based on the integration value of the rotational angle of the motor for steering 5 detected or estimated by the motor control unit 150, and the automatic steering can be continued.

Alternatively, similarly to FIG. 18 of Embodiment 1, when the detection abnormality of the steering angle detection value is detected (in this example, when the abnormality of the steering angle sensor 9 is detected), the automatic steering control unit 120 may calculate the motor output command value based on the detected periphery state, without using the steering angle detection value, instead of the steering angle control unit 130. The automatic steering control unit 120 detects the lateral direction position of the ego vehicle with respect to the traveling lane based on the detected periphery state, and calculates the motor output command value based on the target lateral direction position and the detected lateral direction position. Since the detailed configuration is similarly to Embodiment 1, explanation is omitted.

Alternatively, similarly to FIG. 19 of Embodiment 1, when the detection abnormality of the steering angle detection value is detected (in this example, when the abnormality of the steering angle sensor 9 is detected), the steering angle control unit 130 may calculate the motor output command value, based on the steering angle command value, without using the steering angle detection value. Since the detailed configuration is similarly to Embodiment 1, explanation is omitted.

<Configuration of Steering Assist Control Unit when Abnormality of Torque Sensor is Detected>

The abnormality detection unit 160 detects the abnormality of the torque sensor 3 which detects the steering torque. Various kinds of well-known methods are used for a detecting method of the abnormality of the torque sensor 3.

When the abnormality of the torque sensor 3 is detected, the steering method determination unit 110 or the steering assist control unit 140 estimates the steering torque based on an angle deviation between the steering angle detection value detected by the steering angle sensor 9, and the steering angle estimation value estimated based on the integration value of the rotational angle of the motor for steering 5. By the angle deviation, a torsional angle of a power transmission passage (in this example, the steering shaft 4) between a position of the steering apparatus 8 (in this example, the steering shaft 4) where the steering angle sensor 9 is attached, and a position of the steering apparatus 8 (in this example, the steering shaft 4) where the motor for steering 5 is attached can be detected. The torsional torque is calculated by multiplying the spring constant to the torsional angle, and the torsional torque corresponds to the steering torque. Accordingly, the steering method determination unit 110 or the steering assist control unit 140 calculates a value obtained by multiplying the preliminarily set spring constant to the angle deviation, as the steering torque.

Then, the steering method determination unit 110 determines whether the automatic steering is performed or the steering assist is performed, based on the estimated steering torque. When the steering assist is determined to be performed, the steering assist control unit 140 calculates the motor output command value based on the estimated steering torque, similarly to Embodiment 1.

Even when the abnormality of the torque sensor 3 occurs, the steering torque corresponding to the torsional torque can be estimated, based on the angle deviation between the steering angle detection value detected by the steering angle sensor 9, and the steering angle estimation value estimated based on the integration value of the rotational angle. And, the steering method determination and the steering assist control can be continued.

Alternatively, when the abnormality of the torque sensor 3 is detected, the steering method determination unit 110 may determine a presence or absence of a driving intention by driver, based on one or both of an operating amount of an accelerator pedal, and an operating amount of a brake pedal detected by the sensor; and may determine whether the automatic steering is performed or the steering assist is performed. The steering method determination unit 110 may determine to perform the steering assist, when a magnitude of the operating amount of the accelerator pedal exceeds a determination value, or when a magnitude of the operating amount of the brake pedal exceeds a determination value; and may determine to perform the automatic steering, otherwise.

<Configuration of Automatic Steering Control Unit when State Detection Abnormality is Detected>

The abnormality detection unit 160 detects a state detection abnormality which is a detection abnormality of any one of the traveling state and the peripheral state. The abnormality detection unit 160 detects an abnormality of the traveling state detection apparatus 21. In the present embodiment, the abnormality detection unit 160 detects an abnormality of at least the vehicle speed sensor which detects the vehicle speed, the yaw angular speed sensor which detects the yaw angular speed, and the acceleration sensor of the lateral direction which detects the acceleration in the lateral direction.

The abnormality detection unit 160 detects an abnormality of the periphery monitoring apparatus 20. In the present embodiment, the abnormality detection unit 160 detects an abnormality of the camera, the radar, and the like. Various kinds of well-known methods are used for a detecting method of the abnormality of each sensor and apparatus.

When the state detection abnormality is detected, the automatic steering control unit 120 estimates the traveling state or the periphery state in which the abnormality was detected, based on one or both of the traveling state and the periphery state in which the abnormality is not detected; and calculates the steering angle command value, based on the traveling state and the periphery state which were detected or estimated.

According to this configuration, when the detection abnormality of any one of the traveling state and the periphery state is detected, the traveling state or the periphery state in which the abnormality was detected is estimated based on one or both of the traveling state and the periphery state in which the abnormality is not detected, and the automatic steering control can be continued.

Similarly to Embodiment 1, when the abnormality of the vehicle speed sensor, the yaw angular speed sensor, and the acceleration sensor of the lateral direction is not detected, the automatic steering control unit 120 calculates the steering angle command value, based on the detection values of the vehicle speed, the yaw angular speed, and the acceleration in the lateral direction.

On the other hand, when the abnormality of any one of the vehicle speed sensor, the yaw angular speed sensor, and the acceleration sensor of the lateral direction is detected, the automatic steering control unit 120 estimates the traveling state of the abnormal sensor, based on one or both of the detection values of the traveling state by the normal sensors, and the steering angle detection value, and calculates the steering angle command value, based on the detection values of the traveling state by the normal sensors, and the estimation value of the traveling state of the abnormal sensor.

According to this configuration, when the abnormality of any one of the vehicle speed sensor, the yaw angular speed sensor, and the acceleration sensor of the lateral direction occurs, the traveling state of the abnormal sensor is estimated based on the normal detection value, and the automatic steering control can be continued.

<When Abnormality of Yaw Angular Speed Sensor is Detected>

When the abnormality of the yaw angular speed sensor is detected, the automatic steering control unit 120 estimates the yaw angular speed, based on the steering angle detection value and the detection value of the vehicle speed. As mentioned above, since the yaw acceleration becomes a predetermined relation proportional to each of the steering angle and the vehicle speed, the yaw angular speed can be estimated using this proportional relationship.

Alternatively, if the rotational speeds of right and left wheels are detected respectively as the vehicle speed, the automatic steering control unit 120 may calculate a turning state based on the rotational speed difference between the right and left wheels, and estimate the yaw angular speed.

3. Embodiment 3

The automatic driving support apparatus 1 according to Embodiment 3 will be explained with reference to drawings. The explanation for constituent parts the same as that of Embodiment 1 or 2 will be omitted. The basic configuration of the automatic driving support apparatus 1 according to the present embodiment is the same as that of Embodiment 2. Embodiment 3 is different from Embodiment 2 in that the steering angle sensor 9 with low resolution is provided and accordingly, each processing is changed. FIG. 25 shows a figure in which processings when the abnormality of each sensor is detected are summarized. Processing other than processing when the abnormality related to the steering angle sensor 9 with low resolution is detected are the same as Embodiment 1 or 2.

<Configuration of Steering Angle Detection at Normal Time and Abnormal Time of Steering Angle Sensor>

Figure 26:
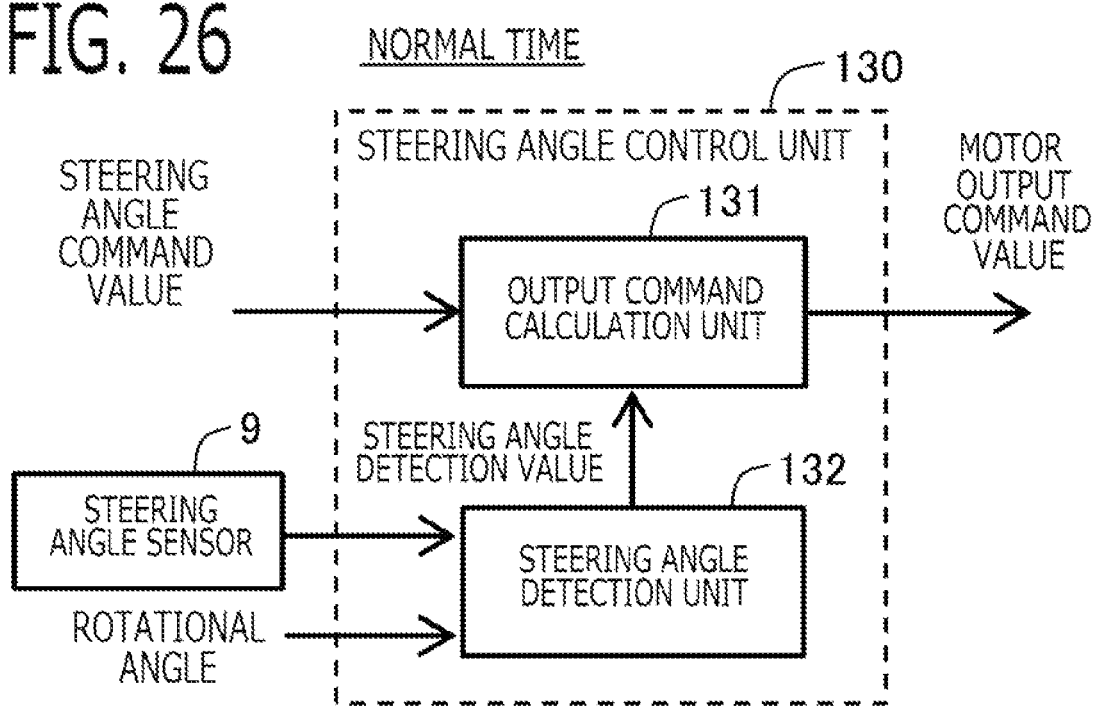
FIG. 26 is a block diagram of the steering angle control unit at normal time according to Embodiment 3.

Similarly to Embodiment 1, the steering angle control unit 130 calculates the motor output command value related to the output torque of the motor for steering 5, based on the steering angle command value and the steering angle detection value. As shown in FIG. 26, the steering angle control unit 130 is provided with the output command calculation unit 131 and the steering angle detection unit 132.

In the present embodiment, an angle detection resolution of the steering angle detection value by the integration value of the rotational angle of the motor for steering is higher than an angle detection resolution of the steering angle detection value by the steering angle sensor 9. Accordingly, it is desired to compensate the low resolution steering angle by the steering angle sensor 9, by the high resolution steering angle estimated by the integration value of the rotational angle of the motor for steering. On the other hand, if the rotational angle of the motor for steering with respect to the steering angle is not strictly managed at assembly time, a correspondence relation between the integration value of the rotational angle of the motor for steering and the steering angle is not decided, and it is not convertible from the integration value of the rotational angle to the steering angle.

Then, when the abnormality of the steering angle sensor 9 is not detected, the steering angle detection unit 132 determines a correspondence relation between the integration value of the rotational angle of the motor for steering, and the steering angle, based on the steering angle detection value by the steering angle sensor 9; and detects the steering angle detection value, based on the determined correspondence relation and the integration value of the rotational angle of the motor for steering. The determined correspondence relation is stored to the nonvolatile storage apparatus, such as EEPROM. On the other hand, when the abnormality of the steering angle sensor is detected, the steering angle detection unit 132 detects the steering angle, based on the correspondence relation determined when the abnormality of the steering angle sensor is not detected, and the integration value of the rotational angle of the motor for steering.

According to this configuration, the correspondence relation between the integration value of the rotational angle and the steering angle is determined at the normal time of the steering angle sensor 9, and irrespective of the normal time or the abnormal time of the steering angle sensor 9, the accurate and high resolution steering angle can be detected by the integration value of the rotational angle using the determined correspondence relation.

For example, when the steering angle sensor 9 is normal, the steering angle detection unit 132 sets the integration value of the rotational angle when the steering angle detection value by the steering angle sensor 9 is 0, to 0, as the correspondence relation; and calculates the integration value of the rotational angle in which the steering angle θ was set to 0. The steering angle detection unit 132 calculates the steering angle detection value by multiplying a conversion coefficient preliminarily set according to the gear ratio, to the integration value of the rotational angle.

Similarly to Embodiment 1, the output command calculation unit 131 changes the motor output command value (in this example, the current command value of q-axis) by a feedback control, such as PI control based on a deviation between the steering angle command value and the steering angle detection value.

<Steering Angle Detection at Abnormal Time of Rotation Angle Sensor>

Figure 27:
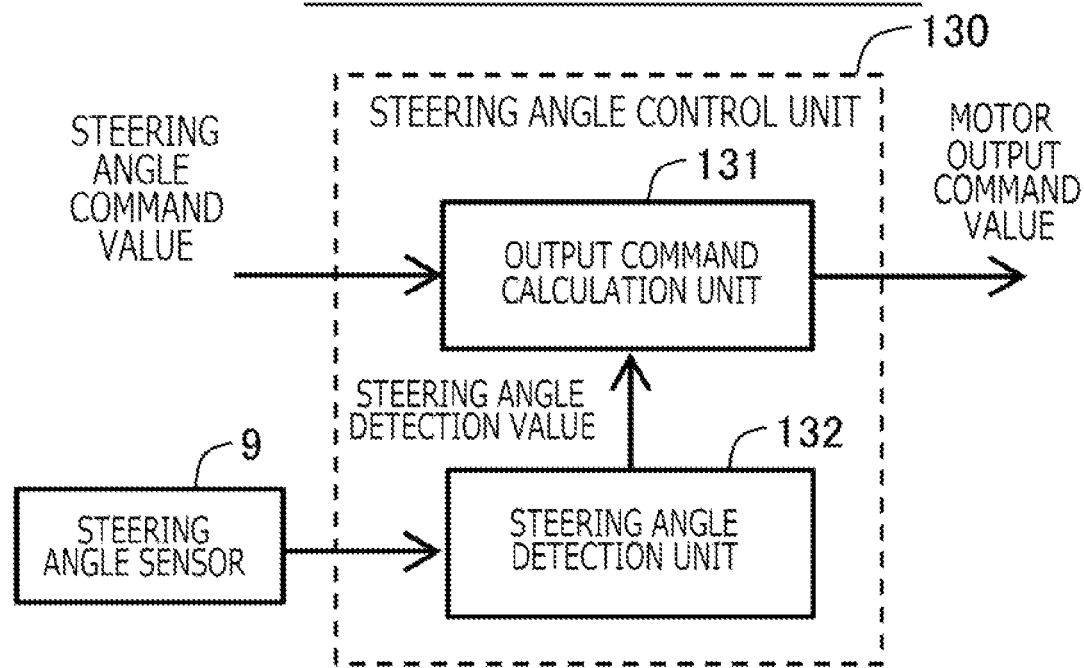
FIG. 27 is a block diagram of the steering angle control unit when the abnormality of the rotation angle sensor is detected, according to Embodiment 3.

In the present embodiment, as shown in FIG. 27, when the abnormality of the rotation angle sensor 32 is detected, the steering angle detection unit 132 performs a smoothing processing to the steering angle detection value by the steering angle sensor 9, and detects the steering angle. As the smoothing processing, a low pass filter or a PLL filter is used. At abnormal time of the rotation angle sensor 32, when the steering angle detection value cannot be calculated by the integration value of the rotational angle, or when the calculation accuracy decreases due to the rotational angle estimation value, the resolution of the steering angle detection value by the low resolution steering angle sensor 9 can be improved by the smoothing processing.

When the abnormality of the rotation angle sensor 32 is detected, the steering angle detection unit 132 may detect the steering angle, based on the steering angle detection value by the steering angle sensor 9, and the integration value of the estimated rotational angle of the motor for steering, using the rotational angle of the motor for steering 5 estimated by the motor control unit 150, similarly to the normal time of the rotation angle sensor 32.

4. Embodiment 4

Figure 28:
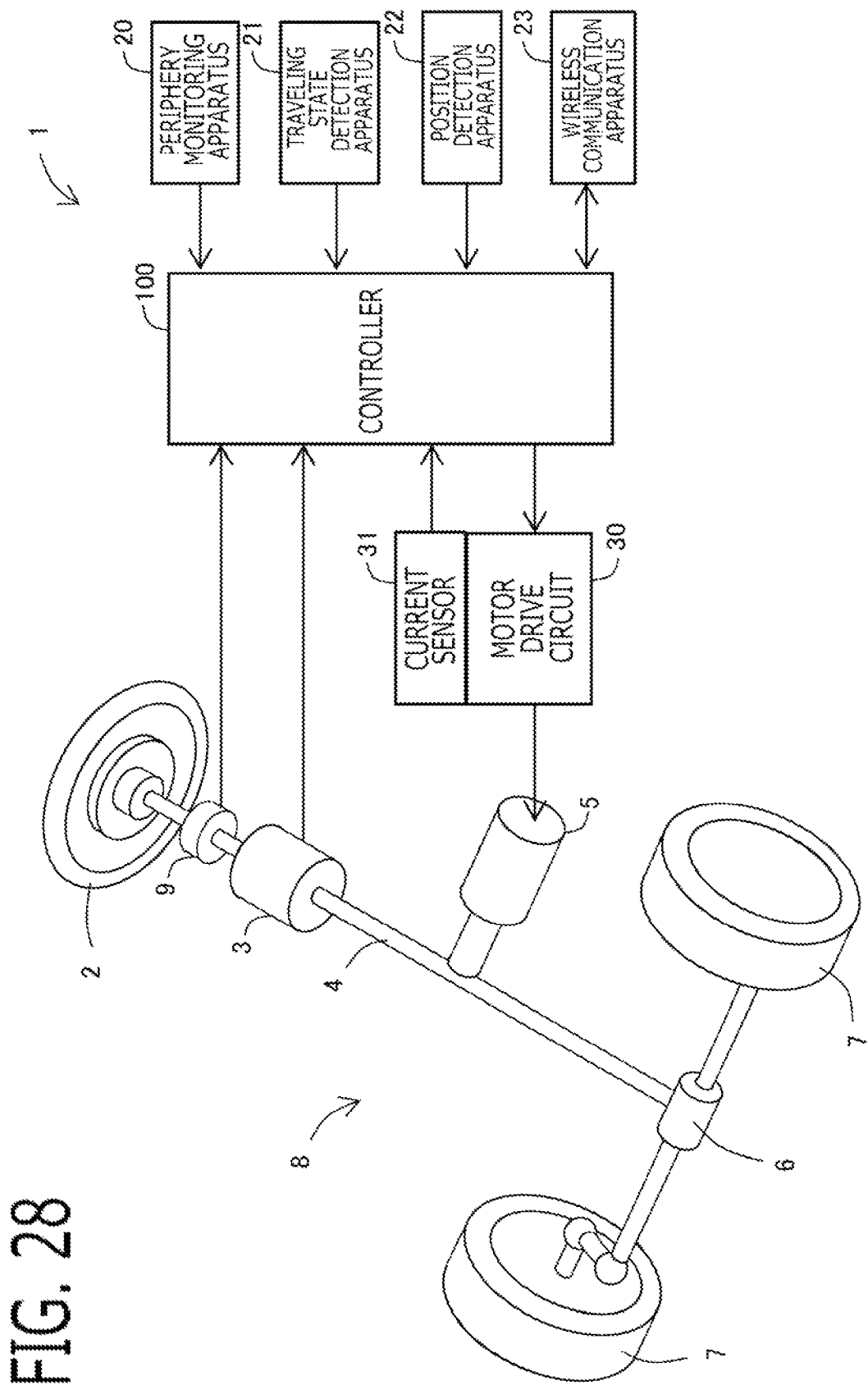
FIG. 28 is a schematic configuration diagram of the automatic driving support apparatus according to Embodiment 4.
Figure 29:
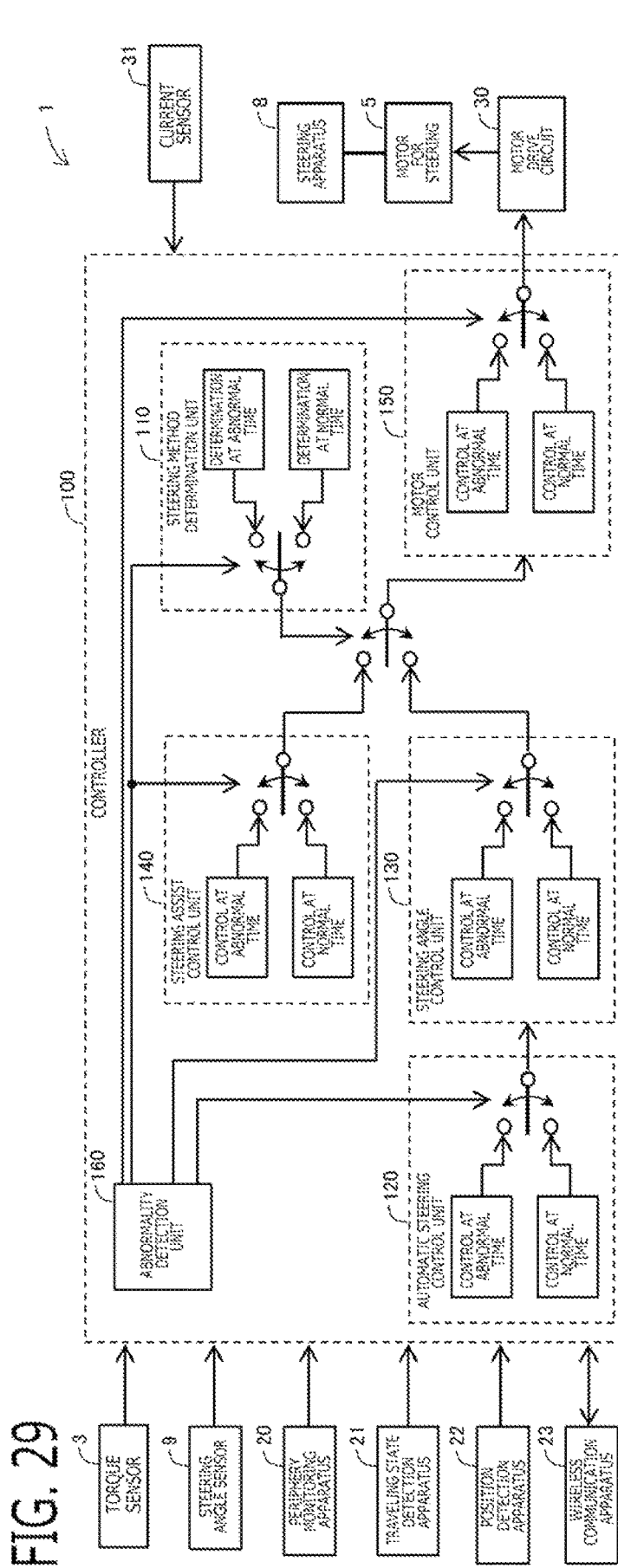
FIG. 29 is a schematic block diagram of the automatic driving support apparatus according to Embodiment 4.

The automatic driving support apparatus 1 according to Embodiment 4 will be explained with reference to drawings. The explanation for constituent parts the same as that of Embodiment 1 or 2 will be omitted. The basic configuration of the automatic driving support apparatus 1 according to the present embodiment is the same as that of Embodiment 1 or 2. Embodiment 4 is different from Embodiment 1 or 2 in that the motor for steering 5 is a DC motor with brush and accordingly, the motor drive circuit 30 and each processing are changed. FIG. 28 shows a schematic configuration diagram of the automatic driving support apparatus 1, and FIG. 29 shows a schematic block diagram of the automatic driving support apparatus 1. FIG. 30 shows a figure in which processings when the abnormality of each sensor is detected are summarized.

<DC Motor with Brush>

The motor for steering 5 is a so-called DC motor with brush. A permanent magnet is provided in the stator and a plurality of armature windings are wound around the rotor. A rotation axis of the rotor is provided with a commutator, and a non-rotation member is provided with the brush in contact with the commutator. The commutator has a plurality of electrode plates which are disposed at equal intervals in the circumferential direction with a gap with each other on the outer circumferential part of the rotation axis. Each electrode plate is connected to the end of specific armature winding. The brush has a first electrode brush 35a, and a second electrode brush 35b. One brush is connected to the positive electrode side of the DC power source 34 via the motor drive circuit 30, and the other brush is connected to the negative electrode side of the DC power source 34 via the motor drive circuit 30. According to rotation of the rotor, the electrode plates of the commutator with which the first electrode brush 35a and the second electrode brush 35b contact are switched, and the armature windings to which currents are supplied are switched. Accordingly, a magnetic field which rotates the rotor is generated in the rotor. A torque generated in the rotor changes according to the currents supplied to the armature windings.

<Motor Drive Circuit>

Figure 31:
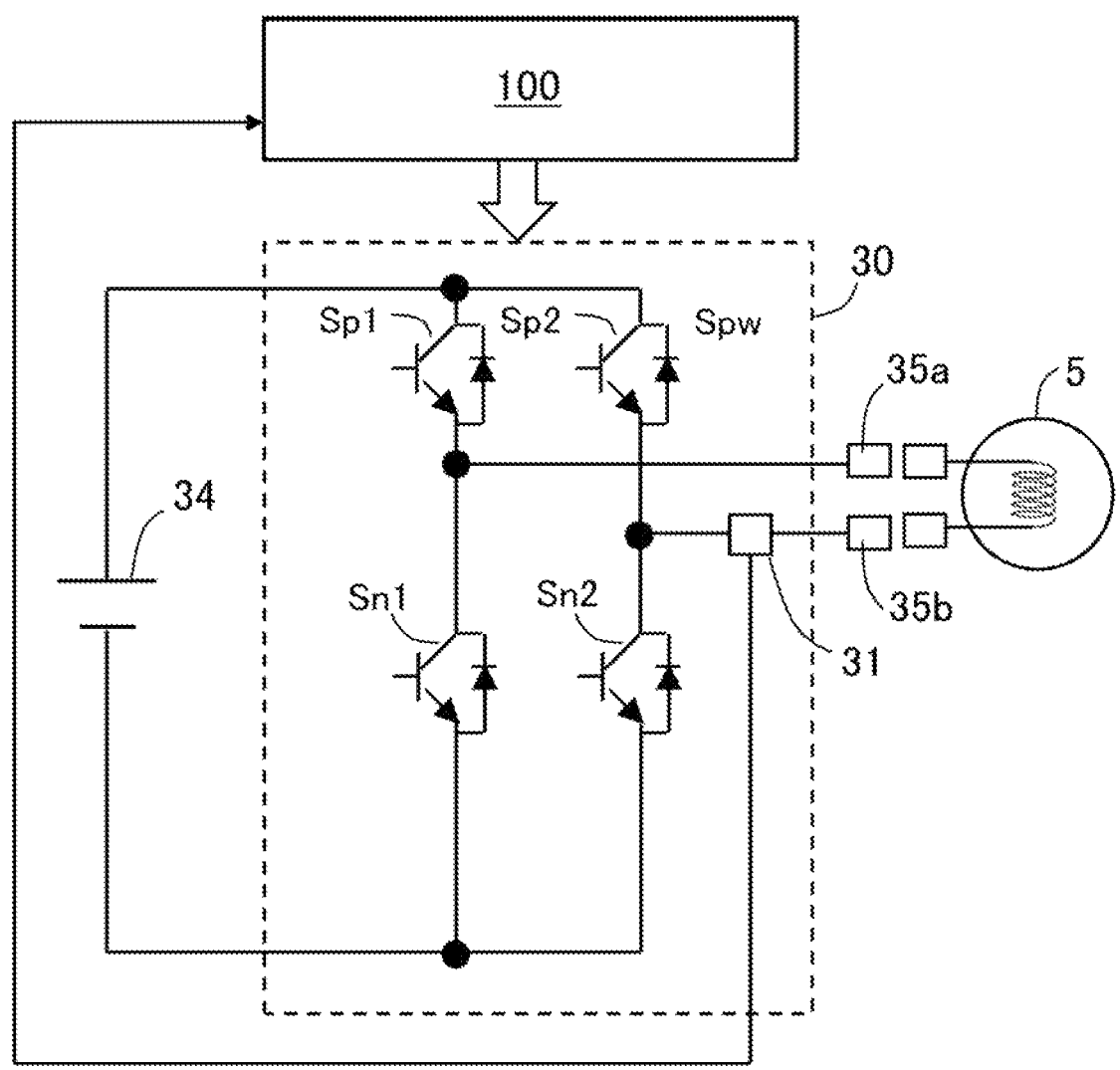
FIG. 31 is a circuit diagram of the motor drive circuit according to Embodiment 4.

The motor drive circuit 30 is provided with switching devices, and turns on and off a power supplied to the motor for steering 5. In the present embodiment, as shown in FIG. 31, the motor drive circuit 30 is H bridge circuit. Specifically, the motor drive circuit 30 is provided with two sets of series circuits in each of which a high potential side switching device Sp connected to the high potential side of the DC power source 34 and a low potential side switching device Sn connected to the low potential side of the DC power source 34 are connected in series. A connection node of two switching devices in the first set of series circuit is connected to the first electrode brush 35a, and a connection node of two switching devices in the second set of series circuit is connected to the second electrode brush 35b.

When the high potential side switching device Sp1 of the first set and the low potential side switching device Sn2 of the second set are turned on, the high potential side of the DC power source 34 is connected to the first electrode brush 35a, and the low potential side of the DC power source 34 is connected to the second electrode brush 35b, and then torque which rotates the rotor to one side is generated. When the low potential side switching device Sn1 of the first set and the high potential side switching device Sp2 of the second set are turned on, the low potential side of DC power source 34 is connected to the first electrode brush 35a, and the high potential side of DC power source 34 is connected to the second electrode brush 35b, and then torque which rotates the rotor to the other side is generated.

The motor drive circuit 30 is provided with a current sensor 31 which detects current which flows into the armature windings of the motor for steering 5. The current sensor 31 may be installed at any point where the current flowing into the armature windings can be detected, such as on the brush side or on the DC power source 34 side.

<Configuration of Motor Control Unit at Normal Time>

Figure 32:
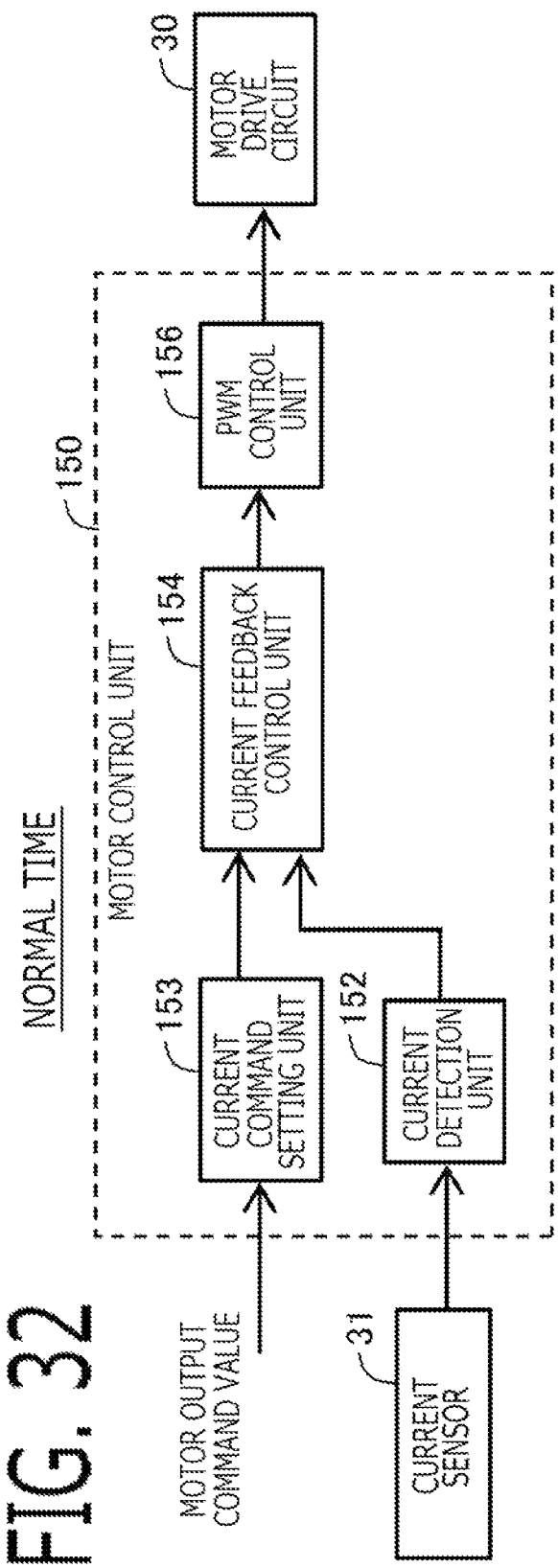
FIG. 32 is a block diagram of the motor control unit at normal time according to Embodiment 4.

The motor control unit 150 generates the driving signals which make the switching devices of the motor drive circuit 30 turn on and off, based on the motor output command value (in this example, the current command value) calculated by the steering angle control unit 130 described below. As shown in FIG. 32, the motor control unit 150 at normal time is provided with a current detection unit 152, a current command setting unit 153, a current feedback control unit 154, and a PWM control unit 156. The current detection unit 152 detects the currents which flow into the armature windings, based on the output signal of the current sensor 31. The current command setting unit 153 sets the current command value, based on the motor output command value.

The current feedback control unit 154 calculates a voltage command value, based on the motor output command value (in this example, the current command value) and the current detection value. The current feedback control unit 154 performs a feedback control which changes the voltage command value so that the current detection value approaches the current command value. When the current command value is a positive value, the PWM control unit 156 controls on/off the high potential side switching device Sp1 of the first set, and the low potential side switching device Sn2 of the second set by PWM control, based on the voltage command value, and turns off the low potential side switching device Sn1 of the first set, and the high potential side switching device Sp2 of the second set constantly. When the current command value is a negative value, the PWM control unit 156 controls on/off the low potential side switching device Sn1 of the first set, and the high potential side switching device Sp2 of the second set by PWM control, based on the voltage command value, and turns off the high potential side switching device Sp1 of the first set, and the low potential side switching device Sn2 of the second set constantly. For example, PWM control unit 156 controls on/off the switching devices by PWM control at ON duty ratio obtained by dividing the voltage command value by the power source voltage.

<Configuration of Motor Control Unit when Short Circuit Abnormality is Detected>

When the short circuit failure of the switching device, the short circuit of the current supply route to the high potential side or the low potential side of the DC power source 34, or the like occurs as the abnormality related to the motor for steering, the abnormality detection unit 160 cannot supply current to the armature windings normally. Various kinds of well-known methods are used for a detecting method of the short circuit failure, and a specifying method of the short circuited part.

When the short circuit abnormality is detected, the motor control unit 150 (the PWM control unit 156) turns off the switching device corresponding to the short circuited part constantly, and controls on/off the switching devices which do not correspond to the short circuited part by PWM control based on the voltage command value, similarly to the normal time.

<Abnormality Detection of Current Sensor>

The abnormality detection unit 160 detects the abnormality of the current sensor 31 as the abnormality related to the motor for steering. Various kinds of well-known methods are used for a detecting method of the abnormality of the current sensor 31. For example, the abnormality detection unit 160 determines the abnormality of the current sensor 31, based on the current detection value when the driving signal is outputted to the motor drive circuit 30.

When the abnormality of the current sensor is not detected, the motor control unit 150 generates the driving signals, based on the motor output command value and the current detection value detected by the current sensor. On the other hand, when the abnormality of the current sensor is detected, the motor control unit 150 generates the driving signals based on the motor output command value without using the current detection value.

According to this configuration, even when the abnormality of the current sensor is detected, the motor for steering outputs torque, and the automatic steering or the steering assist can be continued.

Figure 33:
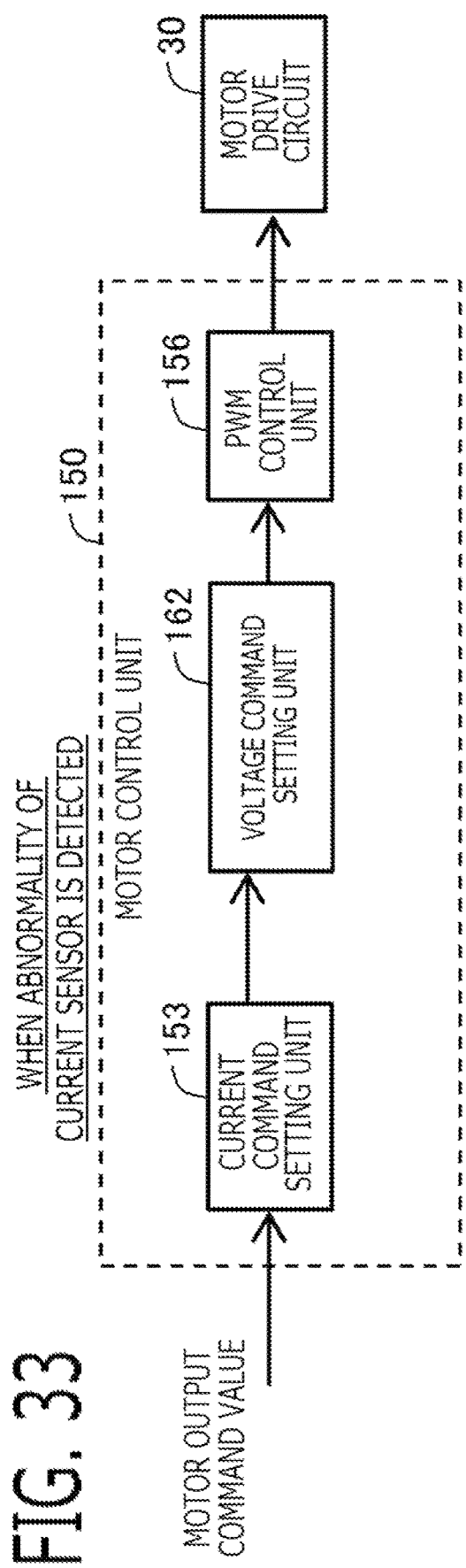
FIG. 33 is a block diagram of the motor control unit when the abnormality of the current sensor is detected, according to Embodiment 4.

In the present embodiment, as shown in FIG. 33, the motor control unit 150 when the abnormality of the current sensor is detected is provided with a current command setting unit 153, a voltage command setting unit 162, and a PWM control unit 156. The configuration of the current command setting unit 153 and the PWM control unit 156 is the same as the normal time. The voltage command setting unit 162 calculates the voltage command value, based on the motor output command value (in this example, the current command value). For example, the voltage command setting unit 162 calculates the voltage command value by multiplying a resistance value of the armature winding to the current command value. The voltage command setting unit 162 may calculate the voltage command value by performing a phase advance processing which expresses an inverse model (R+s×L) of the motor, to the current command value. R is the resistance value of the armature winding, L is the inductance of the armature winding, and s is the Laplace operator.

<Configuration of when Abnormality of Steering Angle Sensor is Detected>

Similarly to Embodiment 2, the automatic driving support apparatus 1 is provided with the steering angle sensor 9 which detects the steering angle. The abnormality detection unit 160 detects the abnormality of the steering angle sensor 9. Similarly to Embodiments 1 and 2, the steering angle control unit 130 calculates the motor output command value related to the output torque of the motor for steering 5, based on the steering angle command value and the steering angle detection value. Similarly to FIG. 23 of Embodiment 2, the steering angle detection unit 132 detects the steering angle by the steering angle sensor 9, when the abnormality of the steering angle sensor 9 is not detected. On the other hand, the steering angle detection unit 132 detects the steering angle, based on the integration value of the rotational angle of the motor for steering 5, when the abnormality of the steering angle sensor 9 is detected.

Figure 34:
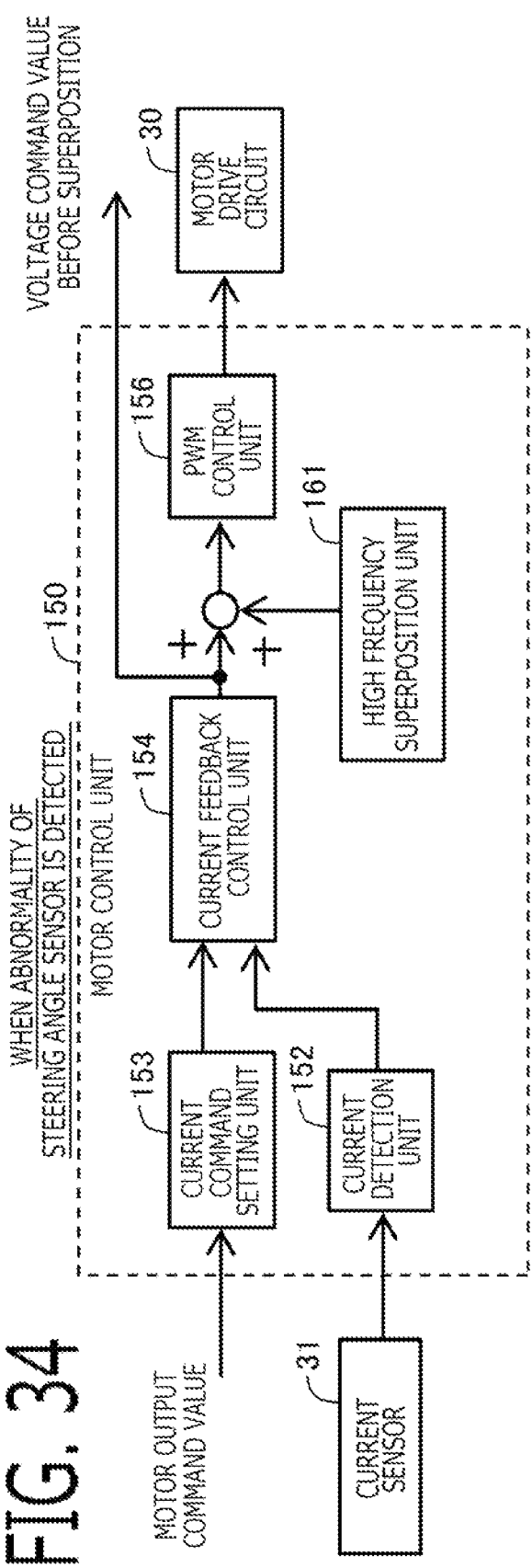
FIG. 34 is a block diagram of the motor control unit when the abnormality of the steering angle sensor is detected, according to Embodiment 4.

As shown in FIG. 34, the motor control unit 150 at abnormal time of the steering angle sensor 9 is provided with a current detection unit 152, a current command setting unit 153, a current feedback control unit 154, a PWM control unit 156, and a high frequency superposition unit 161. The high frequency superposition unit 161 superimposes a high frequency component Vh on the voltage command value calculated by the current feedback control unit 154, when the abnormality of the steering angle sensor 9 is detected. For example, the high frequency component Vh is set as shown in the next equation. Herein, Va is an amplitude of the high frequency component Vh, ωh is an angular frequency of the high frequency component Vh, and t is time. The high frequency angular frequency ωh is set to an angular frequency higher than a cutoff angular frequency of a transfer characteristic of the mechanical system of the motor so that a torque variation does not become large.

[Math. 4]

$$Vh = Va \times \sin(\omega h \times t) \quad (4)$$

The voltage command value after superposition of the high frequency component Vh is inputted into the PWM control unit 156, and the PWM control unit 156 controls on/off the switching devices of the motor drive circuit 30 by PWM control, based on the voltage command value after superposition of the high frequency component Vh.

Figure 35:
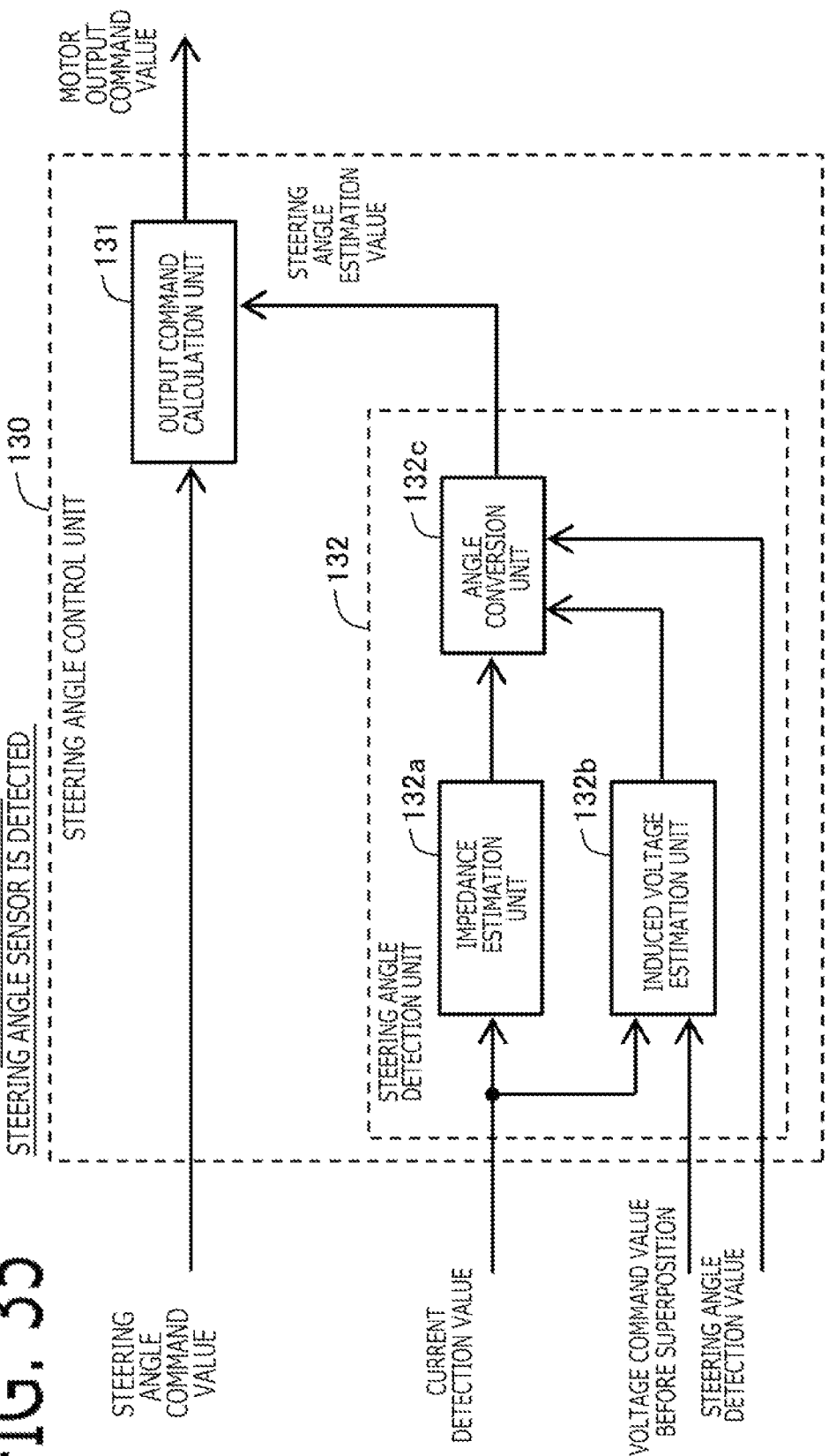
FIG. 35 is a block diagram of the steering angle control unit when the abnormality of the steering angle sensor is detected, according to Embodiment 4.

As shown in FIG. 35, when the abnormality of the steering angle sensor 9 is detected, the steering angle detection unit 132 estimates the rotational angle of the motor for steering based on the current detection value, and detects the steering angle based on an integration value of the rotational angle. In the present embodiment, the method disclosed in "Sensorless Angle Estimation Method for Brushed DC Motor using Impedance Variation by Contact Switching" (IEEJ Trans. IA, Vol. 137, No. 11, pp. 827-836) is used. The steering angle detection unit 132 at abnormal time of the steering angle sensor 9 is provided with an impedance estimation unit 132a, an induced voltage estimation unit 132b, and an angle conversion unit 132c.

The impedance estimation unit 132a uses the equation (A), and the equation (28) to the equation (37) in the above reference. The impedance estimation unit 132a estimates an impedance Zm of the armature winding using the next equation corresponding to the equation (37) in the above reference. Herein, Ia is an amplitude of the high frequency angular frequency ωh component of the current detection value.

[Math. 5]

$$|Zm| = \frac{Va}{Ia} \quad (5)$$

Since the amplitude Va of the high frequency component Vh is set by the high frequency superposition unit 161, it is known. The amplitude Ia of the current detection value is detected by performing the discrete Fourier transform processing which extracts the high frequency angular frequency ωh component or the notch filter processing to the current detection value.

The induced voltage estimation unit 132b uses FIG. 4 and the equation (12) to the equation (18) in the above reference. The induced voltage estimation unit 132b configures the so-called induced voltage observer, calculates an angular speed estimation value ωob based on the current detection value and the voltage command value before superposition of the high frequency component Vh, and integrates the angular speed estimation value ωob to calculate an angle estimation value θob.

Figure 36:
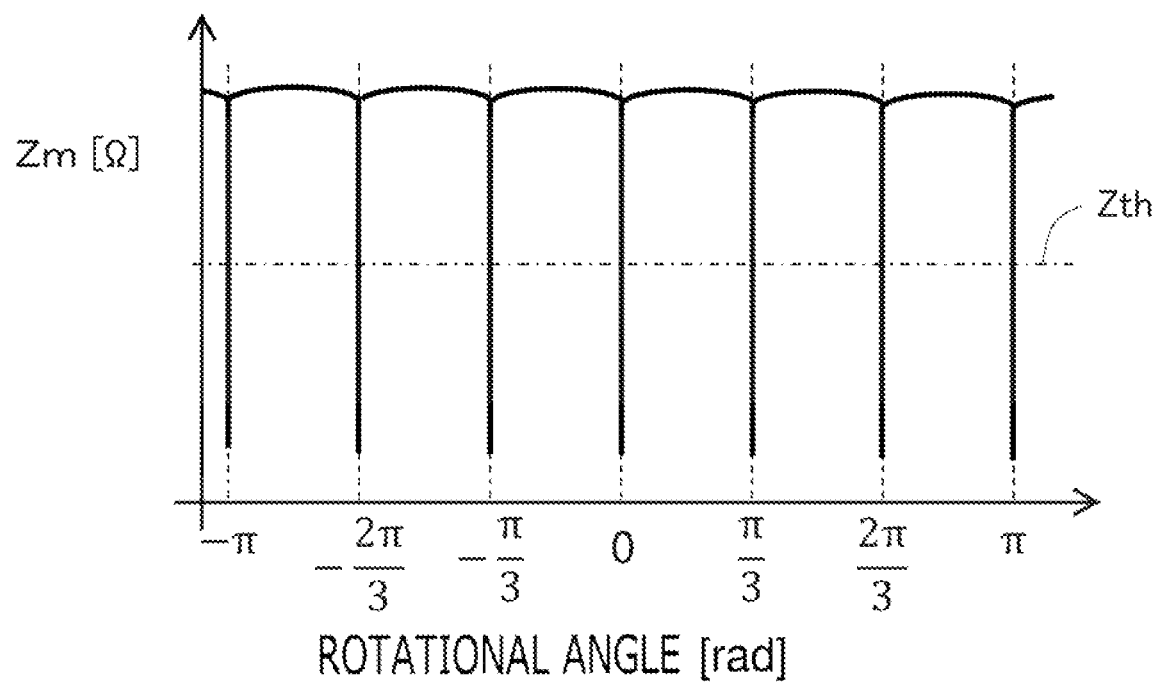
FIG. 36 is a figure for explaining the relation between the estimation value of impedance and the rotational angle, according to Embodiment 4.

FIG. 36 shows a behavior of the impedance Zm of the armature winding estimated by the equation (5). The impedance Zm varies periodically in pulse form, and each timing varied in pulse form corresponds to a specific rotational angle. The angle conversion unit 132c detects the timing when the impedance Zm varied in pulse form by comparing the impedance Zm with a threshold value Zth. At this detected timing, it can be determined that the rotational angle changed by a predetermined angle (in this example, π/3) from the previous detected timing of pulse form variation.

However, since the rotation direction cannot be detected only by this determination, the angle conversion unit 132c determines the rotation direction, based on the angular speed estimation value ωob estimated by the induced voltage estimation unit 132b. Specifically, as shown in the next equation, when the pulse form variation of the impedance Zm is detected, the angle conversion unit 132c updates an angle obtained by adding π/3 to the angle estimation value θest_old updated previously as the angle estimation value θest, when the angular speed estimation value ωob is a positive value; and updates an angle obtained by subtracting π/3 from the angle estimation value θest_old updated previously as the angle estimation value θest, when the angular speed estimation value ωob is a negative value.

[Math. 6]

When the pulse form variation of the impedance Zm is detected,

1) When $\omega ob > 0$, $\theta = \theta est\_old + \pi/3$ \quad (6)

2) When $\omega ob < 0$, $\theta est = \theta est\_old - \pi/3$

Since the induced voltage is proportional to the angular speed, an estimation accuracy of the angle estimation value θob estimated by the induced voltage becomes high, when the angular speed of the motor is sufficiently large, and it becomes low, when the angular speed of the motor is small. Accordingly, the angle conversion unit 132c selects the angle estimation value θest estimated by the impedance fluctuation as the rotational angle estimation value, when the angular speed estimation value calculated based on the angular speed estimation value ωob or the angle estimation value θest is smaller than a determination value; and selects the angle estimation value θob estimated by the induced voltage as the rotational angle estimation value, when the angular speed estimation value is larger than the determination value.

Then, the angle conversion unit 132c integrates the selected rotational angle estimation value, and detects the steering angle based on the integration value. Specifically, the steering angle detection unit 132 calculates the steering angle detection value by multiplying a conversion coefficient preliminarily set according to the gear ratio, to the integration value of the rotational angle. The integration value of the rotational angle when the steering angle is 0 is set to 0. When the steering angle sensor 9 is operating normally, the angle conversion unit 132c stores a correspondence relation between the steering angle detection value detected by the steering angle sensor 9, and the integration value of the rotational angle. When the abnormality of the steering angle sensor 9 is detected, the angle conversion unit 132c calculates the steering angle detection value based on the integration value of the rotational angle using the correspondence relation stored at the normal time. For example, when the steering angle sensor 9 is normal, the angle conversion unit 132c sets the integration value of the rotational angle when the steering angle detection value detected by the steering angle sensor 9 is 0, to 0; and calculates the integration value of the rotational angle on the basis of 0.

As described above, even if the DC motor with brush to which a control using the rotational angle is not performed is used, at the abnormal time of the steering angle sensor 9, the steering angle detection unit 132 estimates the rotational angle based on the current detection value flowing into the DC motor with brush, and calculates the steering angle detection value based on the integration value of the rotational angle, and then the automatic steering can be continued.

5. Embodiment 5

Figure 37:
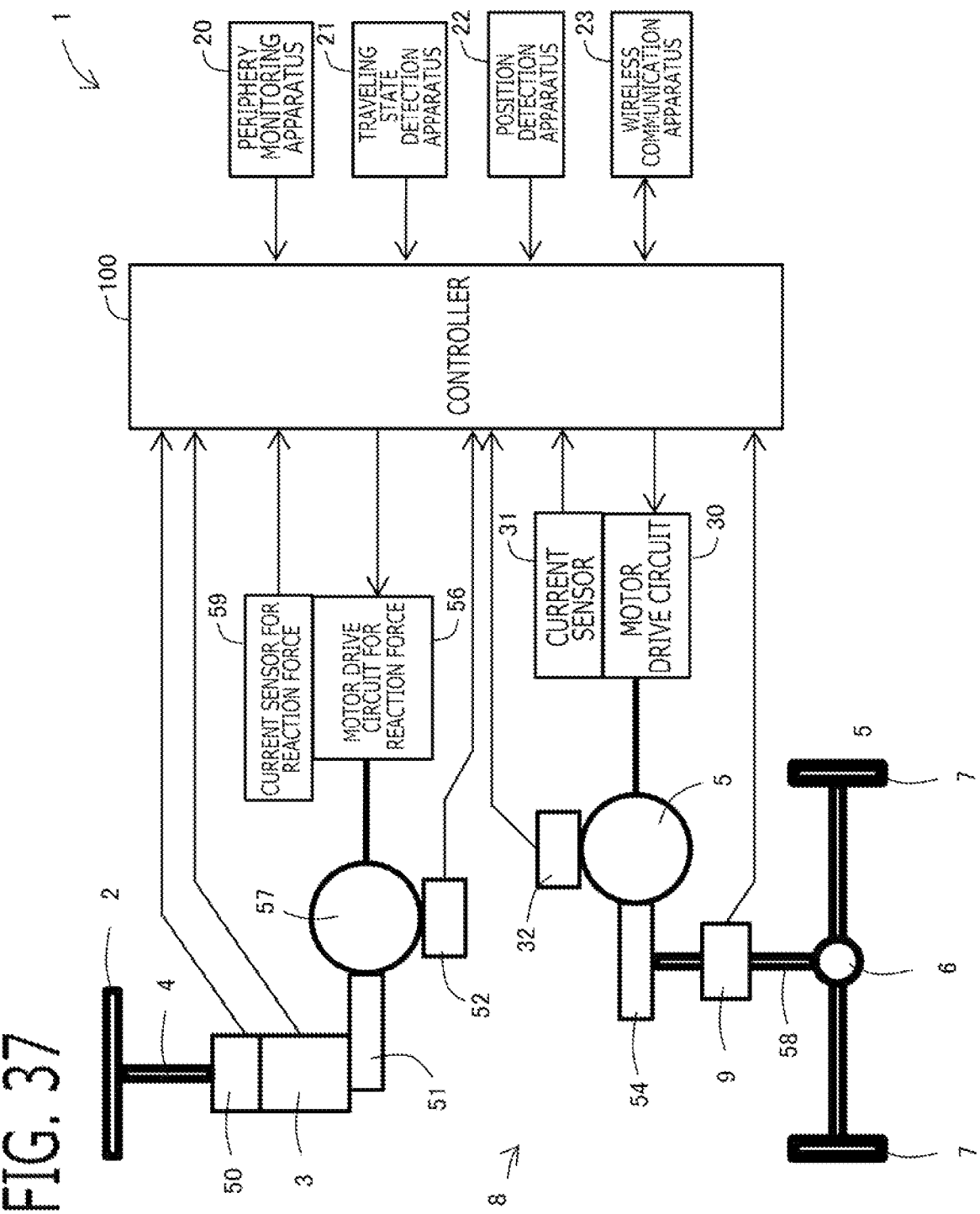
FIG. 37 is a schematic configuration diagram of the automatic driving support apparatus according to Embodiment 5.
Figure 38:
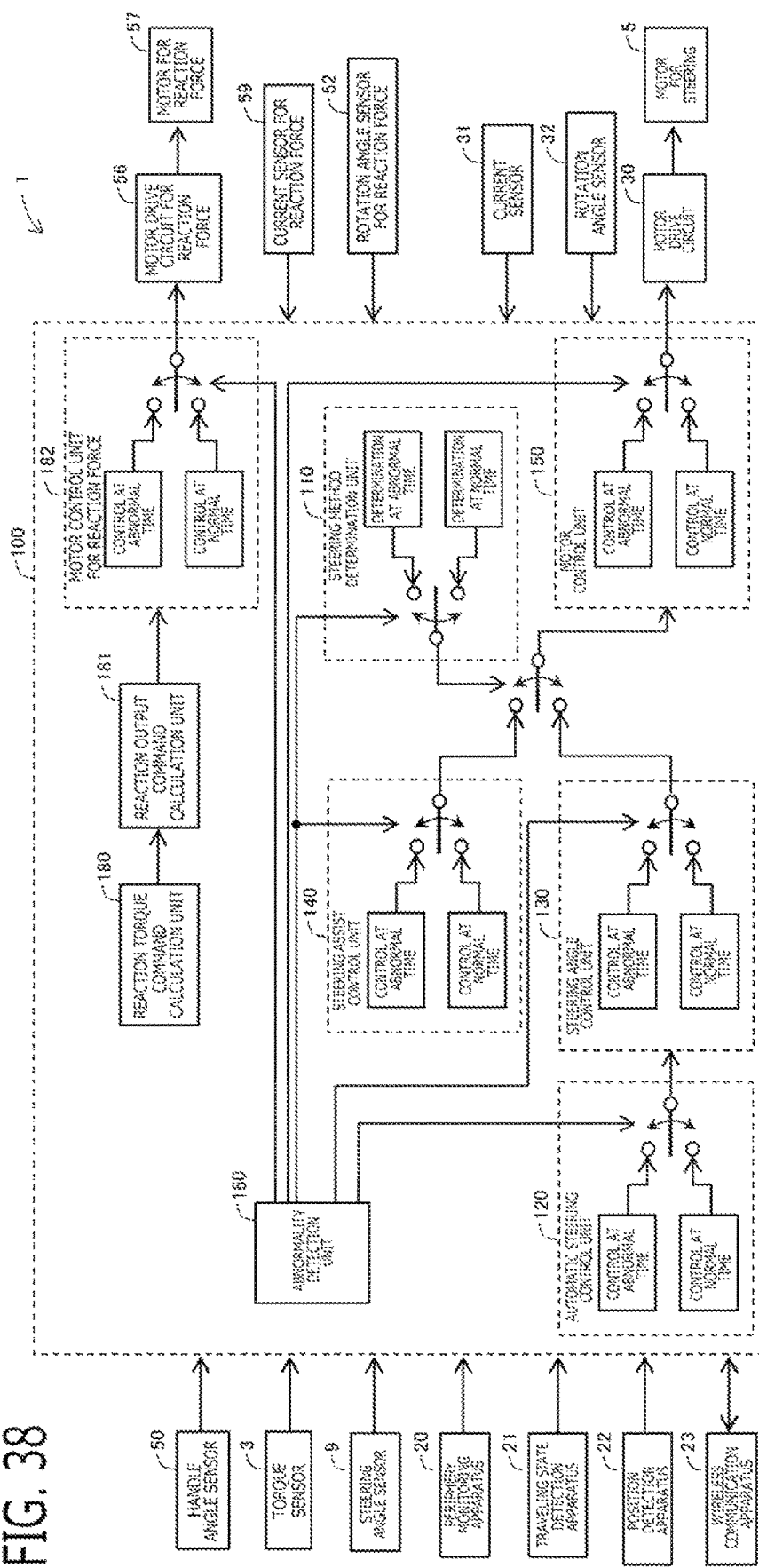
FIG. 38 is a schematic block diagram of the automatic driving support apparatus according to Embodiment 5.

The automatic driving support apparatus 1 according to Embodiment 5 will be explained with reference to drawings. The explanation for constituent parts the same as that of Embodiment 1 or 2 will be omitted. The basic configuration of the automatic driving support apparatus 1 according to the present embodiment is the same as that of Embodiment 1 or 2. Embodiment 5 is different from Embodiment 1 or 2 in that the configuration of the steering apparatus 8 is changed, and accordingly, the configuration of each part is changed. FIG. 37 shows a schematic configuration diagram of the automatic driving support apparatus 1, and FIG. 38 shows a schematic block diagram of the automatic driving support apparatus 1. FIG. 39 shows a figure in which processings when the abnormality of each sensor is detected are summarized.

In the present embodiment, the handle 2 is not mechanically connected with the steering wheel, but it is the so-called steer by wire system. The steering shaft 4 is connected with the handle 2. A rotation axis of a motor for reaction force 57 is connected with the steering shaft 4 via a reduction gear 51. The motor for reaction force 57 outputs a reaction torque against the steering torque of the handle 2 by driver. The motor driving circuit for reaction force 56 turns on and off the power supplied to the motor for reaction force 57. A rotation angle sensor for reaction force 52 for detecting the rotational angle of the motor for reaction force 57 is provided. A current sensor for reaction force 59 for detecting the current flowing into the motor for reaction force 57 is provided. In the steering shaft 4 between the motor for reaction force 57 and the reduction gear 51, and the handle 2, a torque sensor 3 which detects the steering torque of the handle 2 by driver, and a handle angle sensor 50 which detects the rotational angle of the handle 2 are provided.

A rack pinion gear 6 is provided. The rack pinion gear 6 converts a rotary motion of a pinion shaft 58 into a linear motion in the lateral direction, and drives a tie rod and a steering knuckle arm to change the steering angle of the wheels 7. The rotation axis of the motor for steering 5 is connected with the pinion shaft 58 via a reduction gear 54. The motor drive circuit 30 turns on and off the power supplied to the motor for steering 5. The rotation angle sensor 32 for detecting the rotational angle of the motor for steering 5 is provided. The steering angle sensor 9 is provided in the pinion shaft 58.

The motor for steering 5 is an AC motor which is provided with the armature windings of three-phase or more similar to Embodiment 1, and the motor drive circuit 30 is an inverter circuit similar to Embodiment 1. The motor for reaction force 57 is an AC motor which is provided with the armature windings of three-phase or more similar to the motor for steering 5, and the motor driving circuit for reaction force 56 is an inverter circuit similar to the motor drive circuit 30.

As shown in FIG. 38, the controller 100 further is provided with a reaction torque command calculation unit 180, a reaction output command calculation unit 181, and a motor control unit for reaction force 182. The input and output circuit 92 of the controller 100 is connected to the handle angle sensor 50, the rotation angle sensor for reaction force 52, the current sensor for reaction force 59, and the motor driving circuit for reaction force 56. The reaction torque command calculation unit 180, the reaction output command calculation unit 181, and the motor control unit for reaction force 182 may be provided in a controller different from the controller 100.

The reaction torque command calculation unit 180 calculates a motor torque command value for reaction force, based on the steering wheel angle detection value detected by the handle angle sensor 50, and the vehicle speed. Since a relation similar to the equation (2) exists between the steering wheel angle and the torque, using an equation in which the parameters of the equation (3) are replaced for this control, the motor torque command value for reaction force may be calculated based on the steering wheel angle detection value. Alternatively, similarly to FIG. 5 of JP 6628017 B, the motor torque command value for reaction force may be calculated from the basic map which uses the vehicle speed as the input parameter, or a handle angular speed may be calculated by differentiating the steering wheel angle detection value, and the motor torque command value for reaction force may be calculated by multiplying a damper gain calculated according to the vehicle speed, to the handle angular speed.

The reaction output command calculation unit 181 calculates a motor output command value for reaction force, based on the motor torque command value for reaction force and the detection value of steering torque detected by the torque sensor 3. For example, the reaction output command calculation unit 181 changes the motor output command value for reaction force so that the detection value of steering torque approaches the motor torque command value for reaction force by PI control or the like. In the present embodiment, the reaction output command calculation unit 181 calculates a current command value of q-axis as the motor output command value for reaction force. The reaction output command calculation unit 181 may calculate a torque command value as the motor output command value for reaction force.

The motor control unit for reaction force 182 generates driving signals which make the switching devices of the motor driving circuit for reaction force 56 turn on and off, based on the motor output command value for reaction force. Since the motor control unit for reaction force 182 is configured similarly to the motor control unit 150 of Embodiment 1, explanation is omitted.

Similarly to the motor for steering, the abnormality detection unit 160 detects an abnormality related to the motor for reaction force which is an abnormality occurred in a control system of the motor for reaction force. Similarly to the motor for steering, the motor control unit for reaction force 182 generates driving signals at abnormal time according to a content of the abnormality related to the motor for reaction force, based on the motor output command value for reaction force, when the abnormality related to the motor for reaction force is detected. Similarly to the motor for steering, the abnormality detection unit 160 detects the circuit abnormality of any one phase as the abnormality related to the motor for reaction force. Similarly to the motor for steering, the motor control unit for reaction force 182 generates driving signals which make the switching devices of the remaining normal plural phases turn on and off, based on the motor output command value for reaction force, when the circuit abnormality of any one phase is detected.

Similarly to Embodiment 1, the steering method determination unit 110 determines whether the automatic steering is performed or the steering assist is performed, based on the detection value of the steering torque detected by the torque sensor 3. Similarly to Embodiment 1, when the automatic steering is determined to be performed, the automatic steering control unit 120 detects the traveling state of the ego vehicle, and the periphery state of the ego vehicle; and calculates the steering angle command value, based on the traveling state and the periphery state which were detected. Similarly to Embodiment 1, the steering angle control unit 130 calculates the motor output command value related to the output torque of the motor for steering 5, based on the steering angle command value and the steering angle detection value. Similarly to Embodiment 1, when the steering assist is determined to be performed, the steering assist control unit 140 calculates the motor output command value based on the detection value of steering torque, instead of the automatic steering control unit 120 and the steering angle control unit 130. Similarly to Embodiment 1, the motor control unit 150 generates driving signals which make the switching devices of the motor drive circuit 30 turn on and off, based on the motor output command value.

Even in the steer by wire system, since the controls when each abnormality is detected are similarly to Embodiment 1 to 3, explanation is omitted. That is, even in the steer by wire system, by the controls when the abnormality is detected similar to Embodiments 1 to 3, the automatic steering or the steering assist can be continued.

Similarly to Embodiment 4, the motor for steering 5 may be a DC motor with brush, and the control when the abnormality is detected similar to Embodiment 4 may be performed. Similarly to Embodiment 4, the motor for reaction force 57 is a DC motor with brush, and the controls when the abnormality related to the motor for reaction force is detected similar to Embodiment 4 may be performed.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Automatic Driving Support Apparatus, 5: Motor for Steering, 9: Steering Angle Sensor, 20: Periphery Monitoring Apparatus, 21: Traveling State Detection Apparatus, 30: Motor Drive Circuit, 31: Current Sensor, 32: Rotation Angle Sensor, 110: Steering Method Determination Unit, 120: Automatic Steering Control Unit, 130: Steering Angle Control Unit, 140: Steering Assist Control Unit, 150: Motor Control Unit, 160: Abnormality Detection Unit

What is claimed is:

1. An automatic driving support apparatus comprising:
an automatic steering controller that detects a traveling state of an ego vehicle and a peripheral state of the ego vehicle, and calculates a steering angle command value of a steering apparatus of the ego vehicle based on the detected traveling state and the detected peripheral state;
a motor for steering that drives the steering apparatus;
a motor drive circuit that is provided with switching devices, and turns on and off power supplied to the motor for steering;
a steering angle controller that calculates a motor output command value related to an output torque of the motor for steering, based on the steering angle command value and a steering angle detection value;
a motor controller that generates driving signals which make the switching devices of the motor drive circuit turn on and off, based on the motor output command value; and
an abnormality detector that, for an abnormality related to the motor for steering which is an abnormality occurred in a control system of the motor for steering, detects a corresponding kind of the abnormality related to the motor for steering among preliminarily set plural kinds of the abnormalities related to the motor for steering,
wherein the motor controller generates driving signals at abnormal time according to the detected kind of the abnormality related to the motor for steering, based on the motor output command value, when the abnormality related to the motor for steering is detected.

2. The automatic driving support apparatus according to claim 1, further comprising:
a steering method determiner that determines whether an automatic steering is performed by the automatic steering controller and the steering angle controller or a steering assist of driver is performed, based on a detection value of a steering torque of handle by driver; and
a steering assist controller that calculates the motor output command value, based on the detection value of the steering torque, instead of the automatic steering controller and the steering angle controller, when the steering assist is determined to be performed,
wherein the abnormality detector detects an abnormality of a torque sensor which detects the steering torque, and
wherein the steering method determiner or the steering assist controller estimates the steering torque, based on an angle deviation between the steering angle detection value detected by a steering angle sensor, and a steering angle estimation value estimated by integrating a rotational angle of the motor for steering.

3. The automatic driving support apparatus according to claim 1,
wherein the motor for steering is an AC motor which is provided with armature windings of three phases or more,
wherein the motor drive circuit is provided with the switching devices which turn on and off a voltage application to the armature winding of each phase,
wherein the abnormality detector detects a circuit abnormality of any one phase as the abnormality related to the motor for steering,
wherein, when the circuit abnormality of any one phase is detected, the motor controller generates the driving signals which make the switching devices of normal remaining plural phases turn on and off, based on the motor output command value,
wherein, when the circuit abnormality of any one phase is detected, the steering angle controller corrects the steering angle command value so as to avoid a torque reduction steering angle which is a steering angle corresponding to a rotational angle of the motor for steering where the output torque is reduced, corresponding to one phase that the circuit abnormality occurred,
and calculates a motor output command value at abnormal time, based on a steering angle command value after correction, and the steering angle detection value.

4. The automatic driving support apparatus according to claim 3,
wherein the steering angle controller changes the torque reduction steering angle, based on a kind of circuit abnormality which is an open circuit abnormality or a short circuit abnormality, and an abnormal phase.

5. The automatic driving support apparatus according to claim 1,
wherein the abnormality detector detects an abnormality of a current sensor which detects a current supplied to the motor for steering as the abnormality related to the motor for steering,
wherein the motor controller generates the driving signals based on the motor output command value and a current detection value detected by the current sensor, when the abnormality of the current sensor is not detected; and
generates the driving signals based on the motor output command value without using the current detection value, when the abnormality of the current sensor is detected.

6. The automatic driving support apparatus according to claim 1,
- wherein the abnormality detector detects an abnormality of a rotation angle sensor which detects a rotational angle of the motor for steering as the abnormality related to the motor for steering,
- wherein the motor controller generates the driving signals based on the rotational angle of the motor for steering detected by the rotation angle sensor, when the abnormality of the rotation angle sensor is not detected; and
- estimates a rotational angle of the motor for steering based on a current which flows into the motor for steering, and generates the driving signals based on a rotational angle estimation value of the motor for steering, when the abnormality of the rotation angle sensor is detected,
- wherein the steering angle controller detects a steering angle based on an integration value of the rotational angle of the motor for steering detected by the rotation angle sensor, when the abnormality of the rotation angle sensor is not detected; and
- detects a steering angle based on an integration value of the rotational angle estimation value of the motor for steering estimated by the motor controller, or estimates a steering angle based on the detected traveling state, when the abnormality of the rotation angle sensor is detected.

7. The automatic driving support apparatus according to claim 1,
- wherein the abnormality detector detects a detection abnormality of the steering angle detection value,
- wherein the steering angle controller calculates the motor output command value based on the steering angle command value and the steering angle detection value, when the detection abnormality of the steering angle detection value is not detected,
- wherein the automatic steering controller calculates the motor output command value based on the detected peripheral state detected by a periphery monitoring apparatus monitoring the periphery of the ego vehicle, without using the steering angle detection value, instead of the steering angle controller, when the detection abnormality of the steering angle detection value is detected.

8. The automatic driving support apparatus according to claim 7,
- wherein, when the detection abnormality of the steering angle detection value is detected, the automatic steering controller detects a lateral direction position of the ego vehicle with respect to a traveling lane, based on the detected peripheral state, and
- calculates the motor output command value, based on a target lateral direction, and the detected lateral direction position.

9. The automatic driving support apparatus according to claim 1,
- wherein the abnormality detector detects an abnormality of a steering angle sensor which detects a steering angle,
- wherein the steering angle controller detects the steering angle detection value by the steering angle sensor, when the abnormality of the steering angle sensor is not detected, and
- detects the steering angle detection value, based on an integration value of a rotational angle of the motor for steering, when the abnormality of the steering angle sensor is detected.

10. The automatic driving support apparatus according to claim 9,
- wherein the motor for steering is a DC motor with brush,
- wherein the motor controller calculates a voltage command value, based on the motor output command value and a current detection value which flows into the DC motor with brush;
- generates the driving signals which make the switching devices of the motor drive circuit turn on and off, based on the voltage command value; and
- superimposes a high frequency component on the voltage command value, when the abnormality of the steering angle sensor is detected,
- wherein the steering angle controller estimates a rotational angle of the motor for steering, based on the current detection value, when the abnormality of the steering angle sensor is detected.

11. The automatic driving support apparatus according to claim 1,
- wherein the abnormality detector detects an abnormality of a steering angle sensor which detects a steering angle,
- wherein an angle detection resolution of the steering angle detection value by an integration value of a rotational angle of the motor for steering is higher than an angle detection resolution of the steering angle detection value by the steering angle sensor,
- wherein, when the abnormality of the steering angle sensor is not detected, the steering angle controller determines a correspondence relation between the integration value of the rotational angle of the motor for steering, and the steering angle, based on a steering angle detection value by the steering angle sensor; and detects the steering angle detection value, based on the determined correspondence relation and the integration value of the rotational angle of the motor for steering, and
- when the abnormality of the steering angle sensor is detected, the steering angle controller detects the steering angle detection value, based on the correspondence relation which was determined when the abnormality of the steering angle sensor is not detected, and the integration value of the rotational angle of the motor for steering.

12. The automatic driving support apparatus according to claim 11,
- wherein the abnormality detector detects an abnormality of a rotation angle sensor which detects a rotational angle of the motor for steering, and
- wherein the steering angle controller detects the steering angle detection value by performing a smoothing processing to the steering angle detection value detected by the steering angle sensor, when the abnormality of the rotation angle sensor is detected.

13. The automatic driving support apparatus according to claim 1,
- wherein the abnormality detector detects a state detection abnormality which is a detection abnormality of any one of the traveling state and the peripheral state,
- wherein, when the state detection abnormality is detected, the automatic steering controller estimates the traveling state or the peripheral state in which the detection abnormality was detected, based on one or both of the traveling state and the peripheral state in which the detection abnormality is not detected, and calculates the steering angle command value, based on the traveling state and the peripheral state which are detected or estimated, wherein the traveling state includes one of a vehicle speed of the ego vehicle, a roll angular speed, a pitch angular speed, and a yaw angular speed of the ego vehicle, an acceleration in a longitudinal direction, an acceleration in a vertical direction, and an acceleration in a lateral direction, and wherein the detected peripheral state is detected by a periphery monitoring apparatus monitoring the periphery of the ego vehicle.

14. The automatic driving support apparatus according to claim 1, wherein the automatic steering controller detects a vehicle speed, a yaw angular speed, and an acceleration in a lateral direction, as the traveling state, wherein the abnormality detector detects an abnormality of a vehicle speed sensor which detects the vehicle speed, a yaw angular speed sensor which detects the yaw angular speed, and an acceleration sensor of the lateral direction which detects the acceleration in the lateral direction, wherein, when the abnormality of the vehicle speed sensor, the yaw angular speed sensor, and the acceleration sensor of the lateral direction is not detected, the automatic steering controller calculates the steering angle command value, based on detection values of the vehicle speed, the yaw angular speed, and the acceleration in the lateral direction, and when the abnormality of any one of the vehicle speed sensor, the yaw angular speed sensor, and the acceleration sensor of the lateral direction is detected, the automatic steering controller estimates the traveling state of an abnormal sensor, based on one or both of the detection values of the traveling state by normal sensors, and the steering angle detection value; and calculates the steering angle command value, based on the detection values of the traveling state by the normal sensors, and an estimation value of the traveling state of the abnormal sensor.

15. The automatic driving support apparatus according to claim 14, wherein, when the abnormality of the yaw angular speed sensor is detected, the automatic steering controller estimates the yaw angular speed, based on the steering angle detection value and the detection value of the vehicle speed; and calculates the steering angle command value, based on the detection value of the vehicle speed, an estimation value of the yaw angular speed, and the detection value of the acceleration in the lateral direction.

* * * * *